(12) United States Patent  
Yamada et al.

(10) Patent No.: US 7,618,325 B2  
(45) Date of Patent: Nov. 17, 2009

(54) GAME APPARATUS AND STORAGE MEDIUM STORING GAME PROGRAM

(75) Inventors: Yoichi Yamada, Kyoto (JP); Minoru Narita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 266 days.

(21) Appl. No.: 11/121,916

(22) Filed: May 5, 2005

(65) Prior Publication Data

US 2005/0282634 A1 Dec. 22, 2005

(30) Foreign Application Priority Data

May 7, 2004 (JP) ............................. 2004-138429

(51) Int. Cl.
*A63F 13/12* (2006.01)
(52) U.S. Cl. ............................. 463/42; 463/23; 463/33; 463/43; 273/460; 273/461; 455/41.2; 455/151.2; 455/420; 455/513
(58) Field of Classification Search ................ 463/2–8, 463/16, 20, 22–23, 30–34, 36–37, 40–43, 463/46–47, 50, 53, 56, 58–69; 273/108.1, 273/108.3, 108.4, 150, 317.1, 317.3, 317.4, 273/317.5, 317.6, 359, 329–330, 406–407, 273/440.1, 460–461, 138.2, 139, 141 A, 142 R, 273/143 C, 142 B, 142 H; 455/41.2, 134, 455/136, 138, 140, 151.2, 153.2, 226.2, 420, 455/512–513
See application file for complete search history.

(56) References Cited

U.S. PATENT DOCUMENTS 4,372,558 A * 2/1983 Shimamoto et al.
5,428,528 A * 6/1995 Takenouchi et al. ........... 463/42
5,561,419 A * 10/1996 Sasaki et al. ................ 340/2.1

(Continued)

FOREIGN PATENT DOCUMENTS

JP 2-183397 A 7/1990

(Continued)

OTHER PUBLICATIONS

IEEE Computer Society, IEEE Std 802.11g, Jun. 27, 2003, The Institute of Electrical and Electronics Engineers, Inc., 2003 Edition, pp. 30 and 39.*

(Continued)

*Primary Examiner*—Peter BungBa Vo
*Assistant Examiner*—Arthur O. Hall
(74) *Attorney, Agent, or Firm*—Nixon & Vanderhye P.C.

(57) ABSTRACT

A game system includes a plurality of game apparatuses that can carry out short-range wireless communication with one another. Link strength is detected for wireless communication between a parent apparatus and a child apparatus selected as a communication partner thereof. If the link strength is not equal to or more than a predetermined value, the image of a rare item piece is not displayed and the image of a normal item piece alone is displayed even though the partner has the rare item pieces in its possession, for example. Also, the use of the rare item is not permitted. On the other hand, if the link strength is equal to or more than the predetermined value, the use of the rare item is permitted and, if the combination of rare item pieces is successful, for example, the rare item is used.

15 Claims, 14 Drawing Sheets

U.S. PATENT DOCUMENTS

| | | | |
|---|---|---|---|
| 5,605,505 A * | 2/1997 | Han | 463/39 |
| 5,618,045 A * | 4/1997 | Kagan et al. | 463/40 |
| 5,689,814 A * | 11/1997 | Hagisawa et al. | 455/69 |
| 5,702,305 A * | 12/1997 | Norman et al. | 463/42 |
| 5,738,583 A * | 4/1998 | Comas et al. | 463/40 |
| 5,741,184 A * | 4/1998 | Takemoto et al. | 463/43 |
| 5,797,085 A * | 8/1998 | Beuk et al. | 455/88 |
| 5,806,849 A * | 9/1998 | Rutkowski | 463/39 |
| 5,832,385 A * | 11/1998 | Moteki et al. | 455/462 |
| 5,855,483 A * | 1/1999 | Collins et al. | 434/322 |
| 5,999,808 A * | 12/1999 | LaDue | 455/412.2 |
| 6,028,866 A * | 2/2000 | Engel et al. | 370/461 |
| 6,208,855 B1 * | 3/2001 | Tanaka | 455/59 |
| 6,234,902 B1 * | 5/2001 | Hazama | 463/43 |
| 6,270,416 B1 * | 8/2001 | Komoto | 463/43 |
| 6,383,075 B1 * | 5/2002 | Jeong et al. | 463/39 |
| 6,524,189 B1 * | 2/2003 | Rautila | 463/40 |
| 6,544,126 B2 * | 4/2003 | Sawano et al. | 463/42 |
| 6,628,264 B1 * | 9/2003 | Kobayashi et al. | 345/156 |
| 6,643,498 B1 * | 11/2003 | Miyajima | 455/230 |
| 6,674,995 B1 * | 1/2004 | Meyers et al. | 455/41.2 |
| 6,727,816 B1 * | 4/2004 | Helgeson | 340/540 |
| 6,785,561 B1 * | 8/2004 | Kim | 455/566 |
| 6,786,826 B2 * | 9/2004 | Himoto et al. | 463/43 |
| 6,921,336 B1 * | 7/2005 | Best | 463/32 |
| 6,997,809 B2 * | 2/2006 | Watanabe et al. | 463/42 |
| 7,024,501 B1 * | 4/2006 | Wright | 710/72 |
| 7,068,294 B2 * | 6/2006 | Kidney et al. | 715/700 |
| 7,069,044 B2 * | 6/2006 | Okada et al. | 455/556.1 |
| 7,096,006 B2 * | 8/2006 | Lai et al. | 455/412.1 |
| 7,103,029 B1 * | 9/2006 | Minowa | 370/342 |
| 7,217,192 B2 * | 5/2007 | Nishiyama | 463/43 |
| 7,257,547 B1 * | 8/2007 | Terase | 705/15 |
| 2002/0122230 A1 * | 9/2002 | Izadpanah et al. | 359/145 |
| 2002/0160836 A1 * | 10/2002 | Watanabe et al. | 463/42 |
| 2002/0183119 A1 * | 12/2002 | Fessler | 463/47 |
| 2003/0040364 A1 * | 2/2003 | Yabe et al. | 463/43 |
| 2004/0163133 A1 * | 8/2004 | Ueda et al. | 725/133 |
| 2004/0180718 A1 * | 9/2004 | Uchida et al. | 463/31 |

FOREIGN PATENT DOCUMENTS

| | | | |
|---|---|---|---|
| JP | 8-65313 | A | 3/1996 |
| JP | 10-151274 | A | 6/1998 |
| JP | 10151274 | A * | 6/1998 |
| JP | 2000-126445 | A | 5/2000 |
| JP | 2000126445 | A * | 5/2000 |
| JP | 2001-17745 | A | 1/2001 |
| JP | 2002-78976 | A | 3/2002 |
| JP | 2002-126353 | | 5/2002 |
| JP | 2002-281566 | A | 9/2002 |
| JP | 2002-292125 | A | 10/2002 |
| JP | 2004-275412 | | 10/2004 |

OTHER PUBLICATIONS

Nintendo Official Guidebook, Pokemon Fire Red Leaf Green, Gameboy Advance, partial English translation—Trade Center Trading Pokemons Through Communications, Publisher: Shogakukan, ISBN 4-09-106153-2, Mar. 2004, pp. 20-23.

* cited by examiner

GAME APPARATUS AND STORAGE MEDIUM STORING GAME PROGRAM

BACKGROUND OF THE INVENTION

1. Field of the Invention

The present invention relates to a game apparatus and a storage medium storing a game program. More specifically, the present invention relates to a game apparatus and a storage medium storing a game program, which allow a game to be performed in communication among a plurality of game apparatuses by means of wireless communication capabilities.

2. Description of the Prior Art

Conventionally, there are some known game systems on which communication occurs among a plurality of game machines by use of wireless capabilities. For example, a reference document 1 ("Instruction Manual for Pocket Monsters Green: Leaf Green" issued by The Pokémon Company, Jan. 29, 2004, p. 46 to 55) introduces a game system that makes it possible to exchange monsters among a plurality of players and play a communication game such as a player-to-player battle with the use of wireless capabilities.

Additionally, for example, a reference document 2 (Japanese Patent Laying-open No. 2002-126353) discloses a game system on which wireless communication is carried out between a wireless controller and the main body of a game machine and which signal strength in the wireless communication is reflected on a game display screen. In this game system, the field intensity of a received signal is detected at the main body of the game machine, and the information displayed on the display part is modified according to this received signal strength. For instance, when the player with the controller moves away from the main body of the game machine, a character displayed on the display screen comes to the fore. In this manner, modifying the information displayed on the screen in accordance with the actual movement of the player allows the game to be close to a realistic experience.

On the game system in the document 1, however, the signal strength in wireless communication does not affect the progress of the game such as item exchange. Therefore, the player does not play a communication game with consciousness about positional relationships between players, radio status or the like.

In addition, the game system in the document 2 makes a change to the displayed information according to the signal strength between the wireless controller and the main body of the game machine. That is, on this game system, the displayed information is modified just according to the distance between the player and the display screen. Consequently, no change is made to the progress of the game itself even with variations in the distance between the player and the display screen, and it is thus difficult to continuously attract the player's interest in this game system.

SUMMARY OF THE INVENTION

Therefore, it is a primary object of the present invention to provide a novel game apparatus and storage medium storing a game program.

It is another object of the present invention to provide a game apparatus and storage medium storing a game program which can make a change to game details according to the distance between a plurality of game apparatuses carrying out wireless communication, etc.

It is still another object of the present invention to provide a game apparatus and storage medium storing a game program which can change the availability of items according to the status of communication with a wireless communication partner's game apparatus.

A game apparatus according to the present invention is a game apparatus that can carry out short-range wireless communication with at least one other game apparatus. This game apparatus comprises an item data storing means, a link strength detecting means, a strength value determining means and a game processing means. The item data storing means stores item data including at least a first item possessed by this game apparatus itself. The link strength detecting means detects a link strength for wireless communication between this game apparatus and the other game apparatus. The strength value determining means determines whether or not the link strength detected by the link strength detecting means is equal to or more than a predetermined value. The game processing means permits the use of the first item when the strength value determining means has determined that the link strength is equal to or more than the predetermined value.

More specifically, the game apparatus (10: a reference numeral corresponding to that in the preferred embodiments described later. The same applies to the following numerals.) is a game apparatus that can carry out short-range wireless communication with at least one other game apparatus. The item data storing means (32, 48, 72, 84) stores item data including at least the first item (a rare item in the embodiments) possessed by this game apparatus itself. The link strength detecting means (42, 78, S23, S77) detects the link strength for wireless communication between this game apparatus and the other game apparatus. As the link strength, a bit error rate is detected in the embodiments. The strength value determining means (42, S25, S35, S79, S89, S123, S143) determines whether or not the link strength detected by the link strength detecting means is equal to or more than the predetermined value. The game processing means (42, 82, S37 to S41, S91 to S95) permits the use of the first item when the strength value determining means has determined that the link strength is equal to or more than the predetermined value. Thus, since the use of the first item is permitted when the link strength varying in accordance with the distance between the players, etc. is equal to or more than the predetermined value, it is possible to make a change to the details of the game according to the distance between the game apparatuses, etc. Also, since the use of the first item is not permitted unless the link strength is equal to or more than the predetermined value, it is possible to increase rarity in the use of the first item.

In one aspect, the game apparatus further comprises a possessed item receiving means, a possessed item determining means and a possession state displaying means. The possessed item receiving means receives partner's possessed item data related to an item possessed by the other game apparatus. The possessed item determining means determines whether or not the other game apparatus possesses the first item based on the partner's possessed item data. The possession state displaying means displays a message to the effect that the other game apparatus possesses the first item when the possessed item determining means has determined that the other game apparatus possesses the first item.

More specifically, the possessed item receiving means (42, 76, S5, S67) receives partner's possessed item data related to the items possessed by the other game apparatus (communication data including a possessed item list in the embodiments). The possessed item determining means (42, S7, S69) determines whether or not the other game apparatus possesses the first item based on the partner's possessed item data. The possession state displaying means (42, S9, S71) displays a message to the effect that the other game apparatus possesses the first item when the possessed item determining means has determined that it possesses the first item. Therefore, if the other player possesses the first item, a message to that effect is displayed, which makes it possible to know whether the other player has the first item or not even if the link strength is not equal to or more than the predetermined value.

In another aspect, the game apparatus further comprises a possessed item receiving means and an item display control means. The possessed item receiving means receives the partner's possessed item data related to an item possessed by the other game apparatus. The item display control means displays an image of the first item possessed by the other game apparatus when the strength value determining means has determined that the link strength is equal to or more than the predetermined value, and does not display the image of the first item possessed by the other game apparatus when the strength value determining means has determined that the link strength is not equal to or more than the predetermined value.

More specifically, the possessed item receiving means (42, 76, S5, S67) receives the partner's possessed item data related to the items possessed by the other game apparatus (communication data including the possessed item list and a displayed item list in the embodiments). The item display control means (42, 80, S27, S29, S81, S83) displays the image of the first item possessed by the other game apparatus based on the partner's possessed item data when the strength value determining means has determined that the link strength is equal to or more than the predetermined value, and does not display the image of the first item possessed by the other game apparatus when the strength value determining means has determined that the link strength is not equal to or more than the predetermined value. Consequently, the image of the first item possessed by the other player is displayed only when the link strength varying in accordance with the distance between the players, etc. is equal to or more than the predetermined value, which allows the player to see the displayed image of the first item and know easily that there is a possibility that the first item may be used.

In one embodiment, the item data storing means stores item data further including a second item. The game processing means permits the use of the second item alone when the strength value determining means has determined that the link strength is not equal to or more than the predetermined value, and permits the use of both of the first item and the second item when the strength value determining means has determined that the link strength is equal to or more than the predetermined value.

More specifically, the item data storing means stores item data further including the second item (a normal item in the embodiments). The game processing means (42, 82, S37 to S41, S45 to S49, S91 to S95, S99 to S103) permits the use of the second item alone when it is determined that the link strength is not equal to or more than the predetermined value, and permits the use of the both first and second items when it is determined that the link strength is equal to or more than the predetermined value. Therefore, since the use of the second item alone is permitted when the link strength is not equal to or more than the predetermined value and both the use of the second item and the use of the first item are permitted when the link strength is equal to or more than the predetermined value, it is possible to make a change to game details according to the distance between the game apparatuses, etc. Also, it is possible to increase rarity in the use of the first item in comparison with the use of the second item.

In one aspect, the game apparatus further comprises a possessed item receiving means and an item display control means. The possessed item receiving means receives partner's possessed item data related to an item possessed by the other game apparatus. The item display control means displays the images of both of the first item and the second item possessed by the other game apparatus based on the partner's possessed item data when the strength value determining means has determined that the link strength is equal to or more than the predetermined value, and displays the image of the second item alone possessed by the other game apparatus based on the partner's possessed item data when the strength value determining means has determined that the link strength is not equal to or more than the predetermined value.

More specifically, the possessed item receiving means (42, 76, S5, S67) receives the partner's possessed item data related to the items possessed by the other game apparatus (communication data including the possessed item list and the displayed item list in the embodiments). The item display control means (42, 80, S27, S29, S81, S83) displays the images of the both first and second items possessed by the other game apparatus based on the partner's possessed item data when it is determined that the link strength is equal to or more than the predetermined value, and displays the image of the second item alone possessed by the other game apparatus based on the partner's possessed item data when it is determined that the link strength is not equal to or more than the predetermined value. Therefore, it is possible to display the image of the partner's second item alone when the link strength is equal to or more than the predetermined value, and to display the images of both the partner's first and second items when the link strength is equal to or more than the predetermined value. It is thus possible to easily inform the player whether or not there is a possibility that the second item alone is available, or whether or not there is a possibility that the both first item and second item are available.

In another embodiment, the first item is an item of high rarity that is difficult to obtain according to the progress of a game, and the second item is an item of low rarity that is easy to obtain according to the progress of the game.

Thus, since the first item is a high-rarity item and the second item is a low-rarity item, it is possible to further enhance rarity in the use of the first item with respect to the second item.

A storage medium storing a game program according to the present invention is a storage medium storing a game program executed in a game apparatus comprising an item data storing means for storing item data including at least a first item possessed by this game apparatus itself and capable of carrying out short-range wireless communication with at least one other game apparatus. The game program stored in the storage medium causes a processor of the game apparatus to perform a link strength detecting step, a strength value determining step and a game processing step. In the link strength detecting step, detected is the link strength for wireless communication between this game apparatus and the other game apparatus. In the strength value determining step, it is determined whether or not the link strength detected in the link strength detecting step is equal to or more than a predetermined value. In the game processing step, the use of the first item is permitted when it is determined in the strength value determining step that the link strength is equal to or more than the predetermined value.

As in the above described game apparatus, this storage medium storing a game program can make a change to game details by changing the availability of the items according to the distance between the game apparatuses, etc.

According to the present invention, the use of the first item is permitted when the link strength varying with the distance between the game apparatuses, etc. is equal to or more than the predetermined value, which allows the availability of the item to be changed according to the state of wireless communication with the partner's game apparatus. Accordingly, it is possible to make a change to game details in accordance with the distance between the game apparatuses, etc., thereby providing a highly novel and interesting game. In addition, unless the link strength is equal to or more than the predetermined value, the use of the first item is not permitted and thus no event due to the use of the first item takes place, which leads to an increase in the rarity of the first item.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
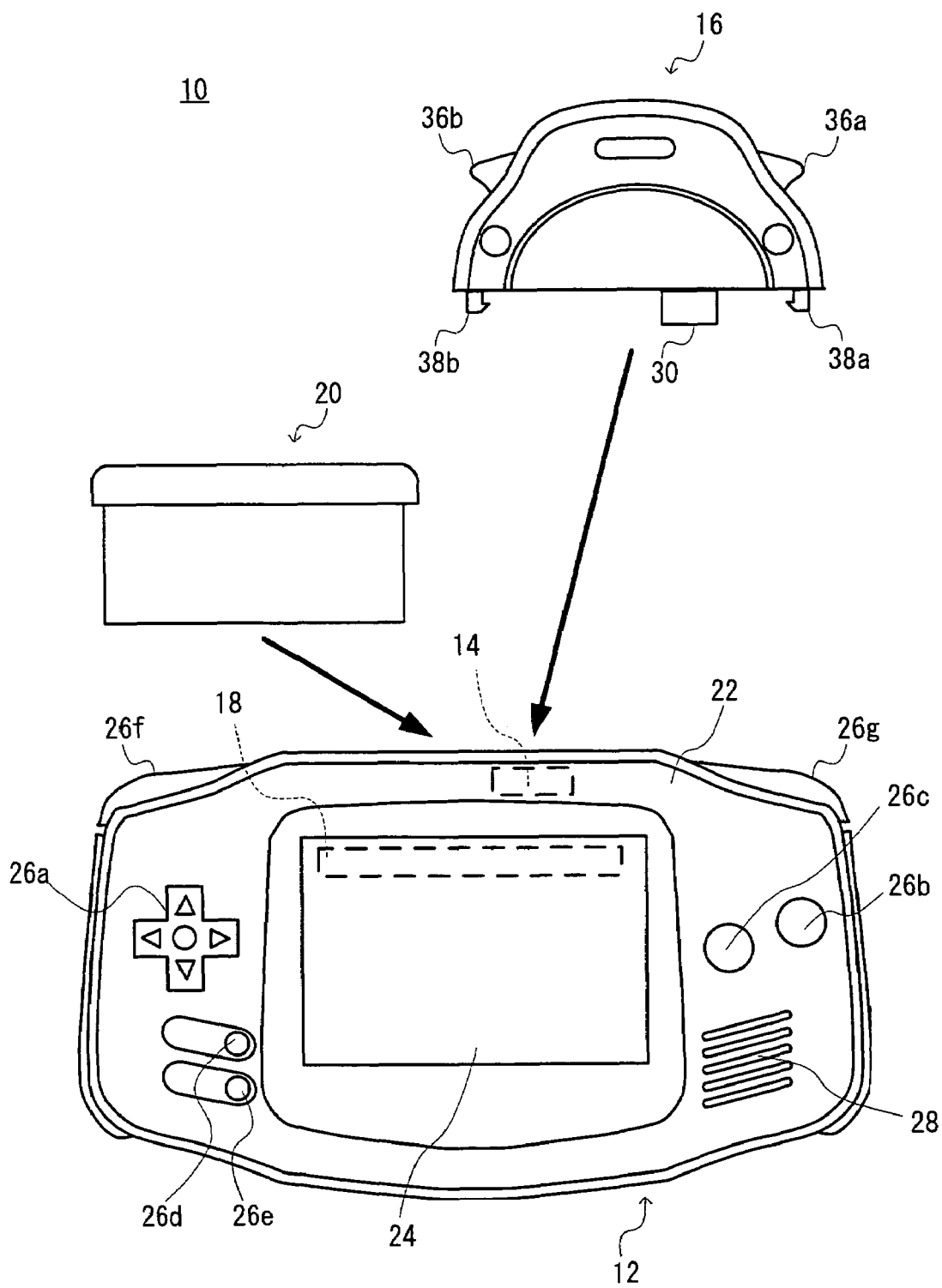
FIG. 1 is an outline view showing one example of a game apparatus used in one embodiment of a game system according to the present invention.

A game system to which the present invention applies employs a hand-held game apparatus as shown in FIG. 1 (hereinafter referred to simply as "game apparatus") as an example. In this embodiment, the game apparatus 10 includes a hand-held game machine (hereinafter referred to simply as "game machine") 12 such as GAMEBOY ADVANCE (product name), a wireless communication unit 16 connected to a communication connector 14 of the game machine 12, and a game cartridge (hereinafter referred to as simply "cartridge") 20 connected to a cartridge connector 18.

Additionally, the game machine 12 is not limited to hand-held game machines, and notebook PCs, cellular phones and personal digital assistants may be applied to this game machine, for example. Also, a game information storage medium is not limited to the cartridge 20. Applicable to this medium are various types of information storage media including optical information storage media such as CD-ROMs and DVD-ROMs, magnet optical discs, magnetic discs, and memory cards.

The game machine 12 includes a horizontally oriented housing 22, for example. Formed on an approximately center of one main surface (front side) of the housing 22 is a liquid crystal display (hereinafter abbreviated as "LCD") 24 as one example of an image displaying means. Also, provided at the right and left ends of the housing 22 on the both sides of the LCD 24 are operating switches 26a to 26g (collectively indicated with a reference numeral "26") as an operating means for the player to perform a game operation. Additionally, a speaker 28 is contained inside a sound release hole provided on the surface of the housing 22 and outputs such sounds as BGM and sound effects during the game.

The operating switch 26 includes a direction switch 26a, an A button 26b, a B button 26c, a start button 26d, a select button 26e, an L button 26f provided in a left corner of the housing 22, and an R button 26g provided in a right corner of the housing 22. Operations specified by individual switches or buttons included in the operating switch 26 vary depending on a game program processed in the game apparatus 10. As an example, the direction switch 26a is used to specify the direction of movement of a player character (a character operated by the player) and move a cursor for selecting an option. The A button 26b is used to specify the action of a player character (making a jump, swing a sword, etc.) and confirm the selection of an option. The B button 26c is utilized for cancellation of a selected option item. The L button 26f and the R button 26g are used to specify actions assigned to the A button 26b and the B button 26c and other actions. The start button 26d and the select button 26e are utilized to start playing a game and stop a game operation.

In addition, the communication connector 14 (indicated by a dotted line) is provided on an upper part of rear side of the housing 22. The communication connector 14 is connected with a connector 30 of the wireless communication unit 16, which establishes electrical connection between the game machine 12 and the wireless communication unit 16. Moreover, formed on the upper part of rear side of the housing is an insertion hole (not illustrated) for detachably attaching the cartridge 20 to the housing, and provided on a bottom of the insertion hole is the cartridge connector 18 (indicated by a dotted line) for electrical connection with the cartridge 20.

The cartridge 20 is an information storage medium for storing a game program and data. By attaching the cartridge 20 to the game machine 12, a semiconductor memory and the like (a ROM 32 and a backup RAM 34 shown in FIG. 2) contained in the cartridge 20 are electrically connected with the game machine 12.

The wireless communication unit 16 has the connector 30 provided on its lower part, a pair of knob portions 36a and 36b provided on its upper part, a pair of engaging portions 38a and 38b provided on its lower part as with the connector 30. The knob portions 36a and 36b protrude right and left from the upper part of the wireless communication unit 16. When the player pulls the both portions in an inward direction from the outside, the engaging portions 38a and 38b protruding from the lower part move outward. Then, when the player stops operating the knob portions 36a and 36b, the engaging portions 38a and 38b each move in an inward direction because the both knob portions 36a and 36b are urged in an outward direction. Meanwhile, formed on the upper part of rear side of the housing 22 of the game machine 12 are engaging holes (not illustrated) for engaging the engaging portions 38a and 38b, respectively. When the player connects the connector 30 of the wireless communication unit 16 to the communication connector 14 of the game machine 12 and also engages the engaging portions 38a and 38b in the above mentioned engaging holes, the wireless communication unit 16 is attached to the game machine 12. The wireless communication unit 16 outputs communication data received from another game apparatus 10 to the game machine 12, and also sends communication data output from the game machine 12 to the other game apparatus 10. Additionally, an antenna for the wireless communication unit 16 to carry out wireless communication with the other game apparatus 10 is formed on a substrate inside the housing and is not exposed to the outside of the housing.

Figure 2:
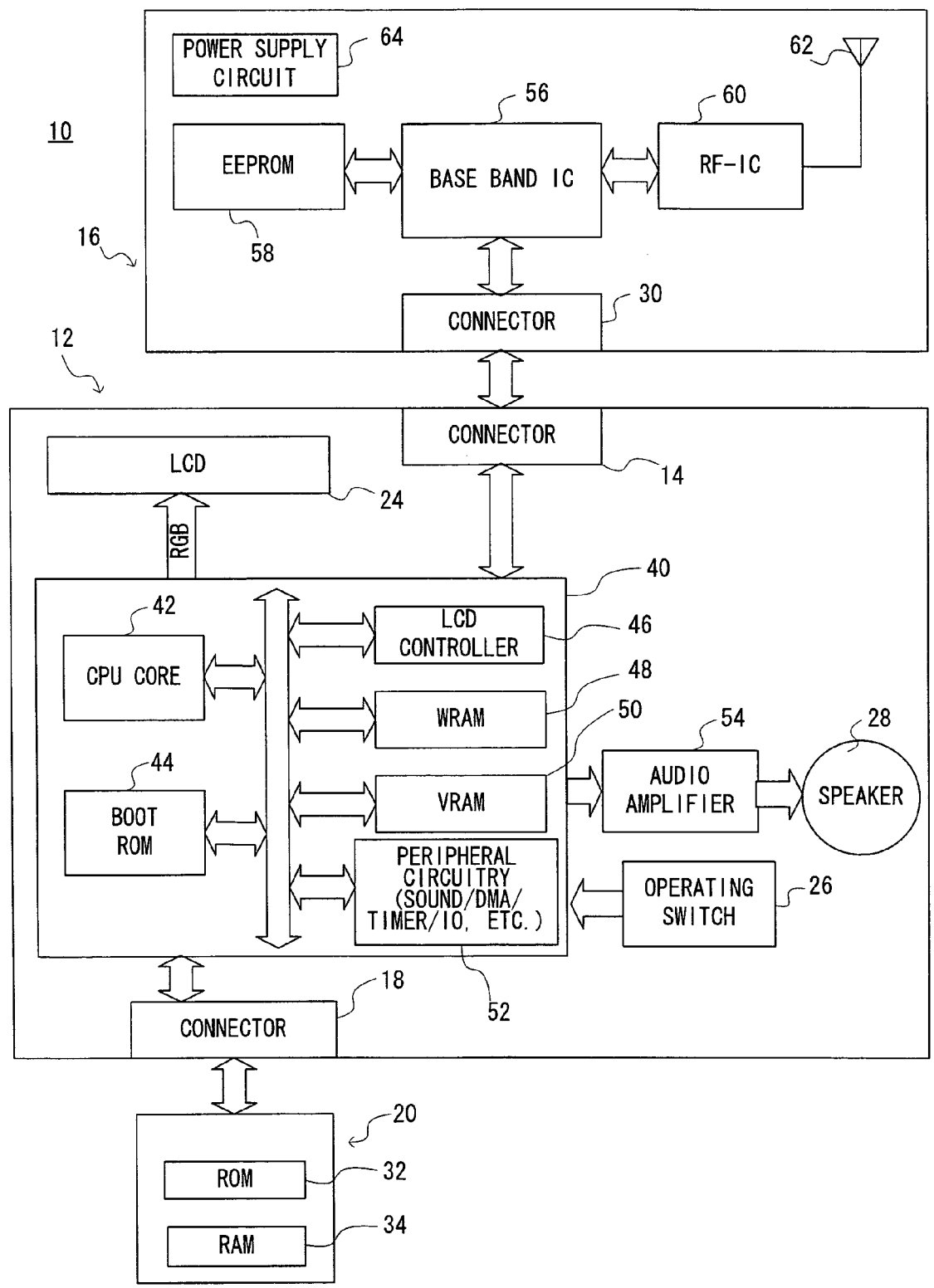
FIG. 2 is a block diagram showing one example of an internal structure of the game apparatus of FIG. 1.

FIG. 2 is a block diagram of the game apparatus 10. The game machine 12 includes a processor 40. The processor 40 includes a CPU core 42, a boot ROM 44, an LCD controller 46, a working RAM (WRAM) 48, a video RAM (VRAM) 50 and peripheral circuitry 52 related to the CPU core 42. Additionally, the peripheral circuitry 52 includes an audio (sound) circuit, a DMA (Direct Memory Access) circuit, a timer circuit, an input/output interface (IO), etc.

The processor 40 provides a display signal, or an RGB signal in this embodiment, to the LCD 24 which thus displays a game image in color. Also, the processor 40 outputs an audio signal to an audio amplifier 54, and, in response to the audio signal, the speaker 28 outputs such sounds as game music and sound effects. In addition, an operating signal from the operating switch 26 is input into the processor 40. Accordingly, the processor 40 performs a process under an operating instruction provided by the user or the player through the operating switch 26.

The cartridge 20 contains the ROM 32 and the backup RAM 34. The ROM 32 stores in advance a game program and data for a game to be performed on the game machine 12, together with the name of the game (identification information on a game program), etc. The backup RAM 34 is intended to save in-progress game data and game result data, and stores such game data via the connector 18 in a rewritable and nonvolatile manner. Additionally, the backup RAM 34 may be composed of a flash memory, etc.

When the game machine 12 is powered on, the CPU core 42 executes a boot program stored in the boot ROM 44 to perform a process of starting the game machine 12. After that, the CPU core 42 executes a game program stored in the ROM 32 of the cartridge 20, and carries out a game process while storing temporary data generated by the execution of the program in the writable/readable WRAM 48. Additionally, image data generated by the CPU core 42 to execute the game program is rendered (stored) on the VRAM 50, and the image data stored in the VRAM 50 is output by the LCD controller 46 to the LCD 24. Also, the CPU core 42 generates data to be transmitted to another game apparatus in a predetermined area of the WRAM 48, and outputs it via the communication connector 14 to the wireless communication unit 16. Besides, data received from the other game apparatus 10 via the wireless communication unit 16 is processed in the CPU core 42 and temporarily stored in a predetermined area of the WRAM 48.

The wireless communication unit 16 is a tool of communication with the other game apparatus 10 by means of short-range radio, and includes a base band IC 56. The base band IC 56 includes a not illustrated ROM which contains OCD (One-Cartridge Download) program, for example, and other programs. The base band IC 56 operates in accordance with these programs.

Incidentally, the one-cartridge download program is a program for downloading a program, etc. to a child apparatus in OC mode (one-cartridge mode in which the parent apparatus alone has a game cartridge and the child apparatus operates upon downloading of programs and data for child apparatus from the cartridge of the parent apparatus).

The wireless communication unit 16 is further provided with an EEPROM 58 which uniquely stores the ID for this game apparatus itself and the name of the player input by the user. The base band IC 56 encodes data (programs, game data, etc.) transferred from the game machine 12 via the communication connector 14 and the connector 30 and data including the player's name, etc. from the EEPROM 58, and sends them an RF (Radio Frequency)-IC 60. The RF-IC 60 modulates the data and transmits a radio wave from an antenna 62. Additionally, the radio field intensity is extremely low and set at a small value to such a degree that the user can use it without a license under the Radio Law. The wireless communication unit 16 is also provided with a power supply circuit 64. The power supply circuit 64 is typically a battery that supplies a direct-current power source to each component of the wireless communication unit 16.

In the wireless communication unit 16, a radio wave transmitted from the other hand-held game apparatus 10 is received by the antenna 62 and demodulated by the RF-IC 60, and then the demodulated signal is input into the base band IC 56. Thus, the base band IC 56 decodes the demodulated signal to reconstitute data, and transfers the data to the game machine 12, i.e., the WRAM 48 via the connector 40 and the communication connector 14.

The game system is composed of a plurality of game apparatuses 10 as mentioned above. One of the plurality of game apparatuses 10 plays a role as a parent apparatus and the other game apparatuses plays a role as a child apparatus. That is, the game system includes the parent apparatus and at least one child apparatus.

Figure 3:
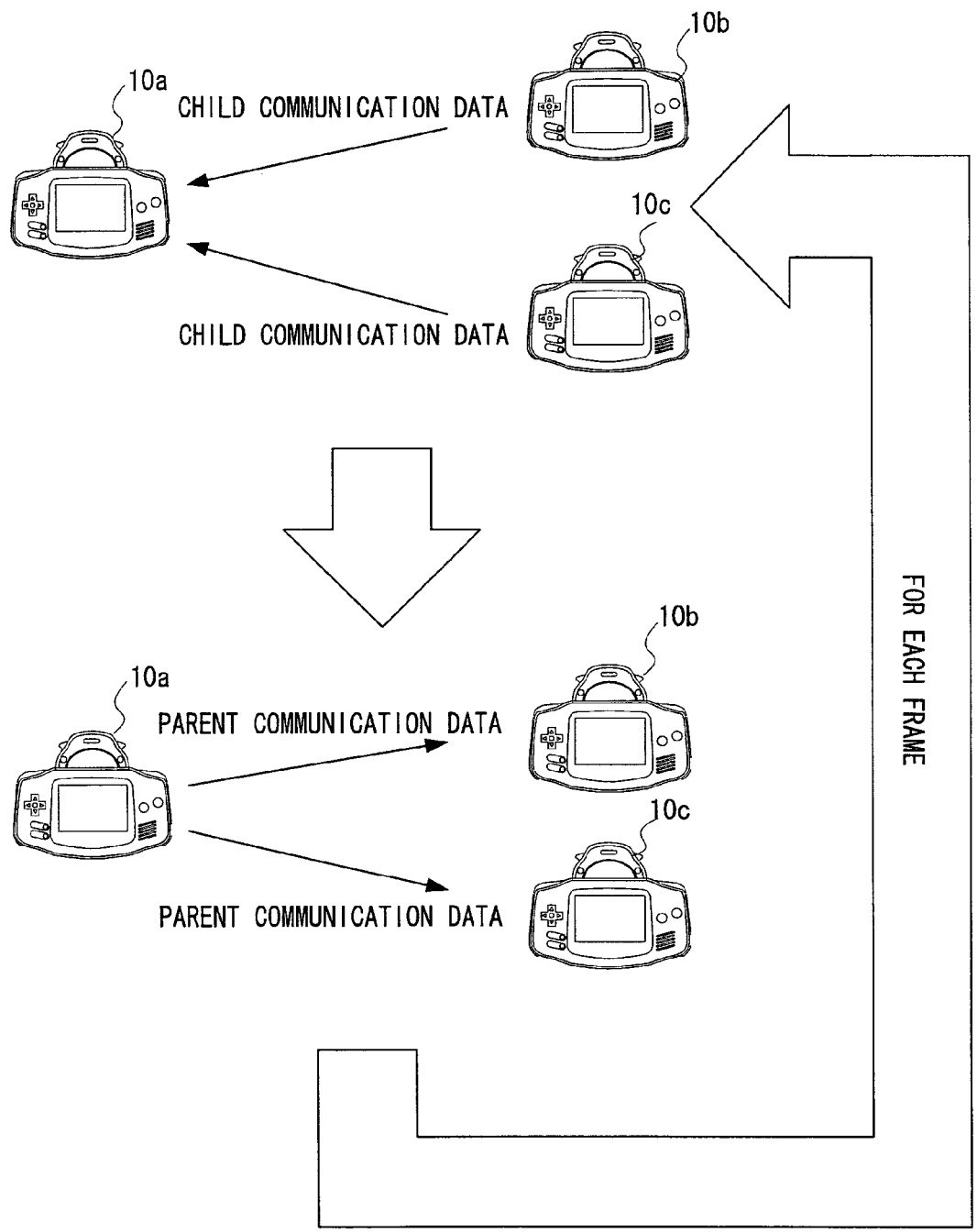
FIG. 3 is an illustrative view showing an outline of the procedure for communication between game apparatuses in the game system.

FIG. 3 shows one example of an outline of procedure for communication between the game apparatuses 10 in the game system. In the example of FIG. 3, the game system includes three game apparatuses 10a, 10b and 10c. The game apparatus 10a is the parent apparatus and the other game apparatuses 10b and 10c are child apparatuses. Connection for wireless communication between the parent apparatus 10a and the child apparatuses 10b and 10c is established in advance of the communication game process.

As shown in FIG. 3, in performing a game process for the progress of the communication game, the child apparatuses 10b and 10c transmit data required for the game process to the parent apparatus 10a. The data is called child communication data and may include the results of the game process performed by the child apparatuses 10b and 10c. The parent apparatus 10a use the child communication data to perform a game process as required. Also, the parent apparatus 10a transmits data required for the game process to the child apparatuses 10b and 10c. The data is called parent communication data and may include the result of the game process performed by the parent apparatus 10a. Every game apparatus 10 (the parent apparatus and the child apparatuses) updates and displays a game image according to the process results. In this embodiment, the game is advanced, for example, by repeating for each single frame a process of sending child communication data from the child apparatuses 10b and 10c to the parent apparatus 10a, a game process performed by the parent apparatus 10a, a process of sending parent communication data from the parent apparatus 10a to the child apparatuses 10b and 10c, and game processes performed by the child apparatuses 10b and 10c. Additionally, it is also possible to synchronize the progress of the game among all the game apparatuses 10 by sharing among them the result of the game process performed by the parent apparatus 10a.

Played in this game system, for example, is such a game in which the player obtains and possesses an item according to the progress of the game. Then, if a predetermined requirement is satisfied, the player can use the item in his possession. More specifically, in using a specific item, the value of link strength detected for wireless communication with the other game apparatus 10 is determined. The availability of the specific item varies depending on the result of the determination. That is, the use of the specific item is permitted if the link strength is equal to or more than a predetermined value, and the use of the specific item is not permitted if the link value is not equal to or more than the predetermined value.

The kinds of items to be obtained during the game are prepared as rare item (first item) and normal item (second item). The rare item is of high rarity and difficult to obtain according to the progress of the game. On the other hand, the normal item is of low rarity and easy to acquire according to the progress of the game. In this embodiment, the rare item corresponds to the above mentioned specific item, and thus the availability of the rare item varies according to the link strength. Since the rare item is higher in rarity than the normal item, the rarity in the use of the rare item can be further increased with respect to the normal item.

Additionally, in this embodiment, each item is formed in such a manner as to make a set (a pair) by a plurality of items (two, for example). Each component of an item is expressed as an item piece. Each item piece constitutes one item in combination with another item piece of the same kind (making a pair).

For example, an item piece paring up with an item piece possessed by this game apparatus is in possession of the other player's game apparatus 10. Therefore, when he identified the game apparatus 10 that possesses a desired item piece from communication with other game apparatuses 10, the player can combine the item piece with his possessed item piece. Then, when these item pieces are successfully combined, the use of the item is permitted. Upon the use of the item, an event associated with the item takes place, for example, and some change is made to the game details.

Figure 4:
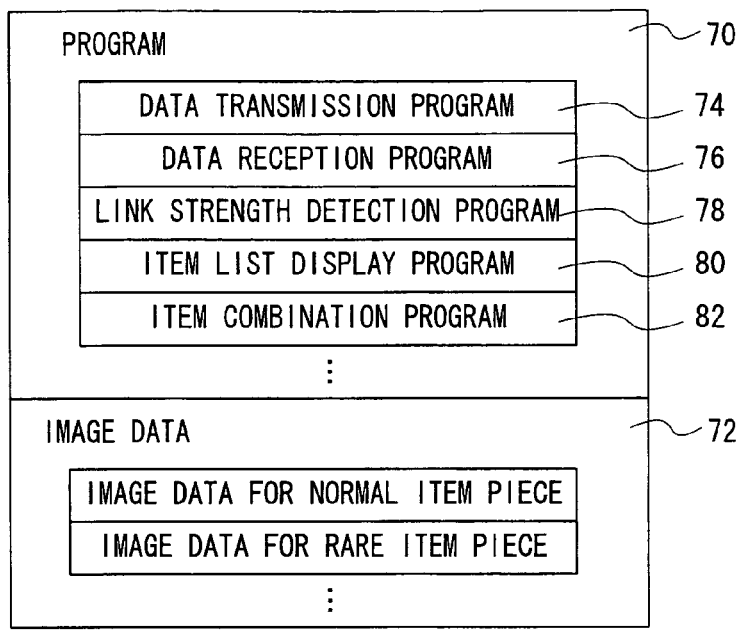
FIG. 4 is an illustrative view showing one example of memory map of a ROM of a cartridge.

FIG. 4 shows one example of a memory map for the ROM 32 of the cartridge 20. The ROM 32 includes a program storage area 70, an image data storage area 72, etc. The program storage area 70 includes a data transmission program storage area 74, a data reception program storage area 76, a link strength detection program storage area 78, an item list display program storage area 80, an item combination program storage area 82, etc.

The data transmission program storage area 74 stores a program for transmitting data to the other game apparatus 10. With this program, the parent apparatus sends data required for a game process to the child apparatus, and the child apparatus transmits data required for a game process to the parent apparatus.

The data reception program storage area 76 stores a program for receiving data from the other game apparatus 10. With this program, the parent apparatus receives data from the child apparatus, and the child apparatus receives data from the parent apparatus. The received data is temporarily stored in a predetermined area of the WRAM 48.

The link strength detection program storage area 78 stores a program for detecting link strength for wireless communication with the other game apparatus 10. More specifically, the link strength is determined by detecting a rate of successful data transmission and reception (bit error rate). Additionally, the link strength may be any kind of information in which the distance between the game apparatuses is reflected. For example, radio field intensity may be detected as link strength. Also, in another embodiment, by storing in advance the bit error rates detected in the past several frames, the value of the link strength at this point in time may be determined on the basis of these bit error rates detected in the past several frames. Besides, in still another embodiment, the game apparatus 10 may transmit verification data for verifying the communication status to the other game apparatus 10 a predetermined number of times, and the other game apparatus 10 may return the same number of verification data as the received verification data, and thus the game apparatus 10 may determine the value of the link strength according to the number of the received returned verification data.

The item list display program storage area 80 stores a program for displaying a list of items possessed by this game apparatus itself and the other game apparatus 10. The list (item display portion) shows a predetermined number of possessed items in such a manner to be classified by kind of item, for example. In this embodiment, however, images of rare items possessed by the other game apparatus 10 are displayed only if it is determined that the link strength is equal to or more than the predetermined value, and they are not displayed if the link strength is not equal to or more than the predetermined value.

The item combination program storage area 82 stores a program for combining item pieces in collaboration with the other game apparatus 10. With this program, if a rare item is selected on this game apparatus by the player of this game apparatus but the link strength is not equal to or more than the predetermined value, no combination for the rare item takes place. If a rare item is selected and the link strength is equal to or more than the predetermined value, or if a normal item is selected, combination for the item takes place. More specifically, the child apparatus transmits to the parent apparatus the child communication data including data indicative of the item piece selected on this child apparatus itself. The parent apparatus determines whether it is possible or not to combine the item piece selected on the child apparatus with the item piece selected on this parent apparatus itself, and then transmits to the child apparatus the parent communication data including determination result data. When the combination successfully occurs, the game details are modified at the parent apparatus and the child apparatus. More specifically, the use of the combined item is permitted for the respective game apparatuses and an event according to the kind of the item takes place, for example.

Besides, although not illustrated, the program storage area 70 further stores various programs required for the progress of the game, such as a program for displaying a game image on the LCD 24 and a program for outputting a sound from the speaker 28.

In addition, the image data storage area 72 stores image data for generating a game screen (display screen) such as image data for a normal item piece and an image data for a rare item piece. The image data storage area 72 stores image data for a plurality of normal item pieces and a plurality of rare item pieces. The CPU core 42 generates a game image based on the image data and renders it in the VRAM 50.

Besides, although not illustrated, the ROM 32 further stores various kinds of data required for the progress of the game such as sound data for outputting sounds such as BGM and sound effects.

Figure 5:
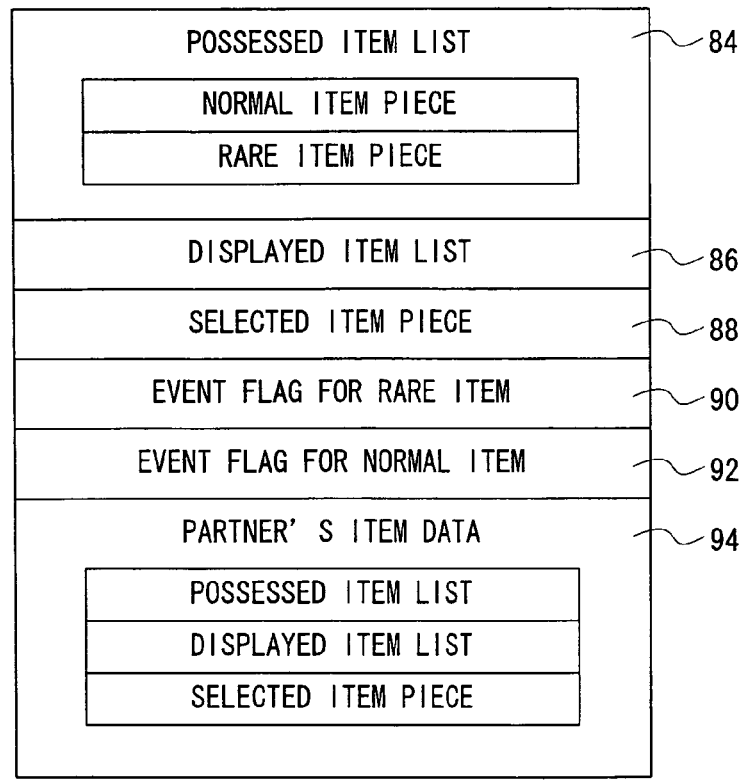
FIG. 5 is an illustrative view showing one example of memory map of a WRAM.

FIG. 5 shows one example of a memory map for the WRAM 48. A possessed item list area 84 stores data indicative of a list of items which are possessed by this game apparatus itself and classified as normal item piece or rare item piece, for example. The list data may use identification information on item piece, for example. In this case, the area 84 stores the identification information on the possessed item pieces. Alternatively, flag data indicating the possession or non-possession of each item piece may be used as this list data. In this case, each flag is turned on when the item piece is possessed, for example.

A displayed item list area 86 stores data that indicates a list of a predetermined number of items pieces displayed in the screen as items pieces possessed by this game apparatus itself. The predetermined number of displayed item pieces are determined by the player to operate the operating switch 26 (the direction switch 26a). As the displayed item list data, the identification information on item piece is stored and updated according to the operation by means of the operating switch 26. Also, a selected item piece area 88 stores data that indicates an item piece selected in this game apparatus for combination with an item piece possessed by the other game apparatus 10. As this kind of data, this area stores identification information on the selected item piece.

A rare item event flag area 90 is a flag area in which an event for rare item occurs. When a rare item combination becomes successful, the rare item event flag is turned on. In addition, a normal item event flag 92 is a flag area in which an event for normal item takes place. When a normal item combination becomes successful, the normal item event flag is turned on.

A partner's item data area 94 stores item-related information transmitted from the other game apparatus 10. More specifically, stored are data related to a possessed item list, a displayed item list, selected item piece, etc. The possessed item list is data on a list of item pieces possessed by the partner's game apparatus 10, which contains the same information as that in the possessed item list area 84. The displayed item list is data on a list of a predetermined number of item pieces displayed in the screen, as item pieces possessed by the partner's game apparatus 10, which contains the same information as that in the displayed item list area 86. In addition, the selected item piece is data indicative of the item piece selected in the partner's game apparatus 10 for combination with an item piece possessed by this game apparatus itself, which contains the same information as that in the selected item piece area 88.

Also, although not illustrated, the WRAM 48 is provided with other data areas and flag areas required for a game process.

Figure 6:
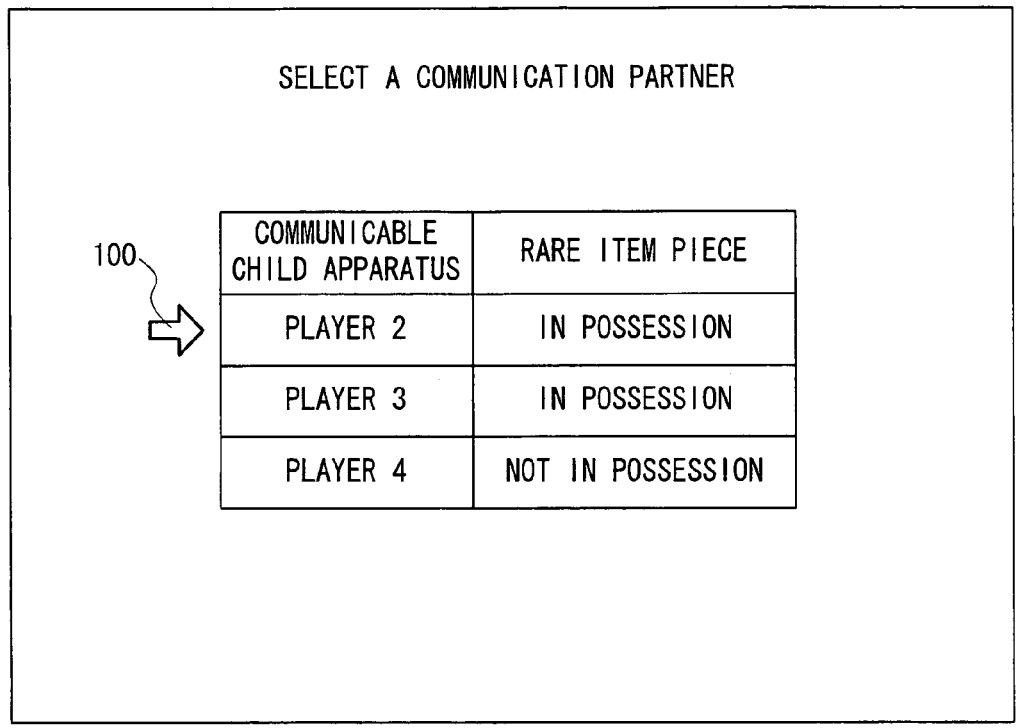
FIG. 6 is an illustrative view showing one example of a game screen for selecting a communication partner to be displayed on a parent apparatus.

FIG. 6 shows one example of a game screen for selecting the communication partner to be displayed on the parent apparatus. In the example of FIG. 6, the game system includes four game apparatuses 10, and the parent apparatus is operated by a player 1 and the three child apparatuses are operated by players 2, 3 and 4, respectively.

The selection screen of FIG. 6 indicates information on the possession of rare item pieces by each of the child apparatuses communicable with this apparatus itself. From the example of FIG. 6, it is found that the game apparatuses 10 of the player 2 and player 3 each have a rare item piece in their possession, and that the game apparatus 10 of the player 4 has no rare item piece in its possession. In addition, players 2, 3 and 4 displayed in the communicable child apparatus section indicate the name of the respective players. Each of the child apparatuses transmits to the parent apparatus the child communication data including information on items possessed by the child apparatus itself. Based on the information, the parent apparatus determines whether or not each of the child apparatuses has a rare item in its possession, and displays a selection screen as shown in FIG. 6. The player 1 of the parent apparatus can decide from the selection screen a communication partner whose item piece is desired for combination. The selection screen shows whether or not each of the child apparatuses existing in a communicable range has a rare item in its possession, which allows the player 1 of the parent apparatus to select an appropriate communication partner with consideration given to the state of the possession of rare items by the parent apparatus itself. For example, if the player 1 of the parent apparatus has a rare item in his possession and intends to use the rare item, the player 1 may select a child apparatus possessing the rare item as a communication partner. In this game screen, the player 1 of the parent apparatus selects a player as a communication partner by operating the direction switch 26a to move a cursor 100 vertically, and confirms the selection of the communication partner by operating the A button 26b. As stated above, the status of the possession of rare item pieces by each child apparatus is displayed regardless of link strength. Therefore, the player 1 of the parent apparatus can know whether the partner player has a rare item or not even though the link strength is not equal to or more than a predetermined value.

In addition, although not illustrated, each child apparatus also shows whether the parent apparatus has a rare item piece or not. The information on items possessed by the parent apparatus is transmitted from the parent apparatus to each child apparatus.

When the parent apparatus selects a child apparatus as a communication partner, the link strength for wireless communication is detected between the parent apparatus and the child apparatus. Also, in this embodiment, if the link strength is equal to or more than a predetermined value, an item list containing rare item pieces is displayed. If the link strength is not equal to or more than the predetermined value, an item list is displayed with the rare item pieces hidden.

Figure 7:
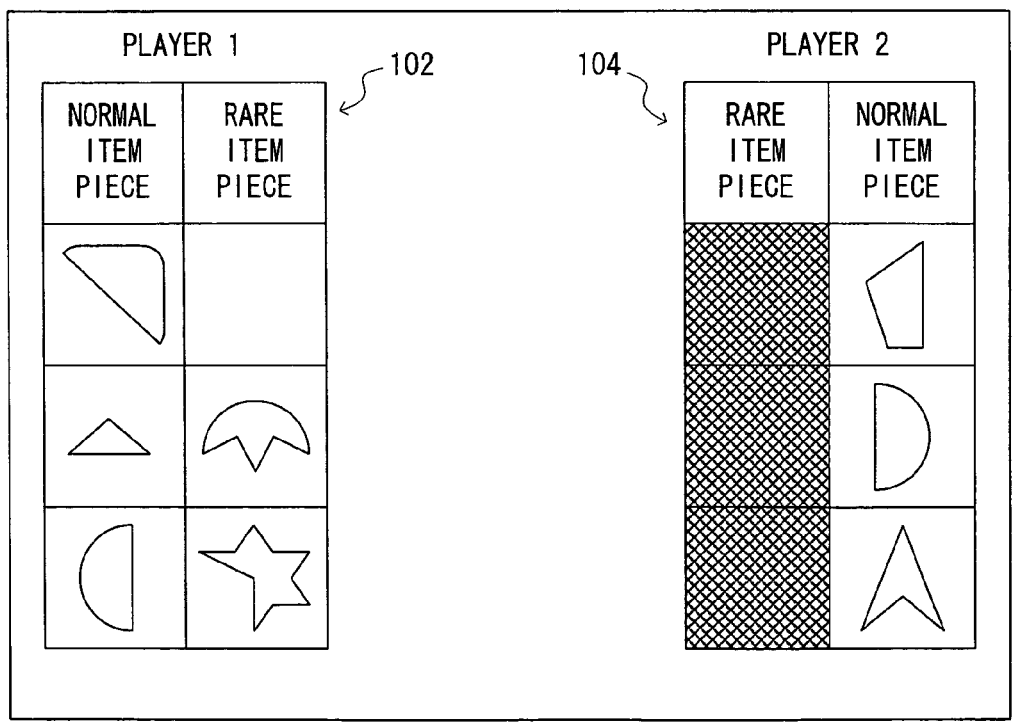
FIG. 7 is an illustrative view showing one example of a game screen displayed on the parent apparatus in the case where a link strength for communication with the partner is not equal to or more than a predetermined value.

FIG. 7 shows one example of a game screen displayed on the parent apparatus. This game screen includes an own item display portion 102 for indicating item pieces possessed by the game apparatus itself and a partner's item display portion 104 for indicating item pieces possessed by the communication partner. The own item display portion 102 and the partner's item display portion 104 are each provided with a display section for image of a normal item piece and a display section for image of a rare item piece. Each of the display sections can display a predetermined number of item pieces (three in this embodiment). The player can select an item piece to be displayed in each of the display sections of the own item display portion 102 by means of the predetermined operating switch 26. The displayed item pieces are scrolled up and down by operating the direction switch 26*a*, for example. Displayed in the partner's item display portion 104 are the same item pieces as those displayed in the own item display portion 102 of the partner's game apparatus 10. The data on the item pieces displayed in the partner's item display portion 104 is transmitted from the communication partner each time a change is made to the item pieces displayed in the own item display portion 102 of the partner's game apparatus 10 in response to an operation input.

In FIG. 7, the game apparatus 10 of the player 2 is the communication partner. The detected strength of a link with the game apparatus 10 of the player 2 is not equal to or more than the predetermined value. Accordingly, the images of normal item pieces possessed by the game apparatus 10 of the player 2 are displayed but the image of the possessed rare item piece is not displayed. As a consequence, the player 1 of the parent apparatus can know from the selection screen of FIG. 6 that the player 2 has a rare item piece but cannot exactly identify what is the rare item piece possessed by the player 2. Also, from the display of normal item and non-display of rare item as mentioned above, the player 1 of the parent apparatus can learn easily that the use of a normal item may be permitted but the use of a rare item will not be permitted, in a relationship with the communication partner.

Besides, although not illustrated, the game apparatus 10 of the player 2 displays a game screen corresponding to the game screen of the parent apparatus shown in FIG. 7. That is, the game screen of the player 2 displays the images of normal items and rare item possessed by this game apparatus itself in the own item display portion 102, and displays the images of the normal items alone possessed by the parent apparatus and does not display the image of the rare items possessed by the parent apparatus in the partner's item display portion 104, as in the case of FIG. 7. Accordingly, the player 2 of the child apparatus knows that the parent apparatus has some rare item pieces but cannot identify exactly what are rare item pieces possessed by the parent apparatus. In addition, the player 2 of the child apparatus can also learn easily that the use of normal items may be permitted but the use of rare items will not be permitted, in a relationship with the parent apparatus.

Figure 8:
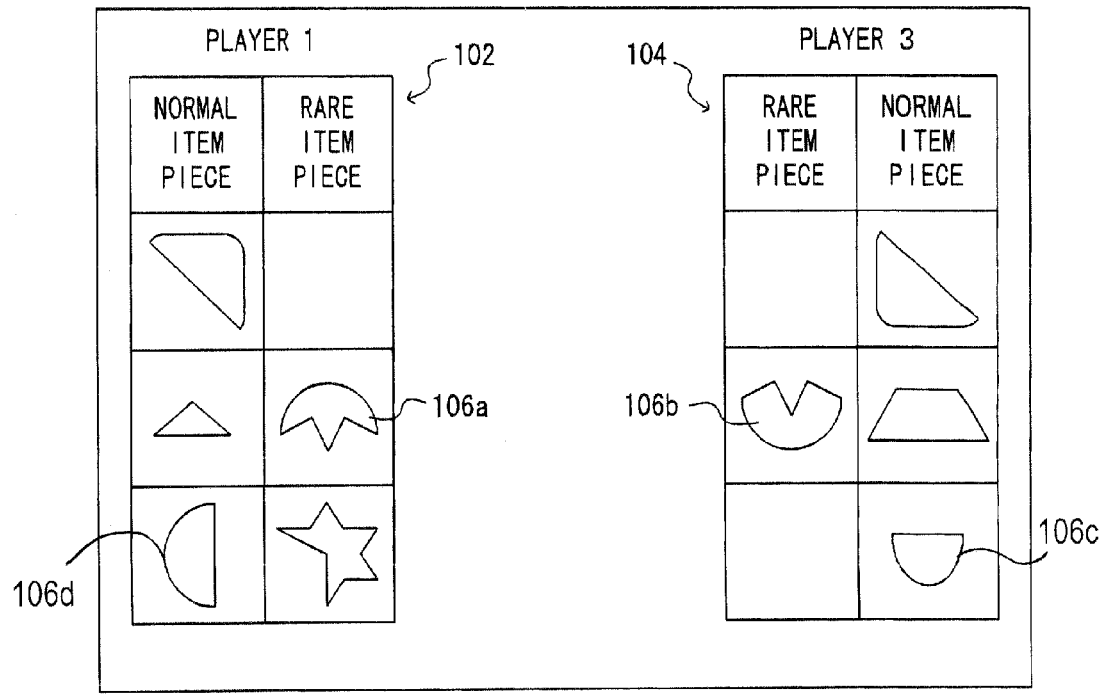
FIG. 8 is an illustrative view showing one example of a game screen displayed on the parent apparatus in the case where a link strength for communication with the partner is equal to or more than a predetermined value.

FIG. 8 shows one example of a game screen displayed on the parent apparatus. In this game screen, the game apparatus 10 of the player 3 is the communication partner. The detected strength of a link with the game apparatus 10 of the player 3 is equal to or more than the predetermined value. Thus, the partner's item display portion 104 displays not only the images of the normal item pieces 106*c* but also the images of the rare item 106*b* possessed by the player 3. Besides, although not illustrated, the game apparatus 10 of the player 3 displays in the partner's item display portion 104 the images of the normal item pieces 106*d* and rare item pieces 106*a* possessed by the parent apparatus, as in the case with FIG. 8.

As stated above, in this embodiment, it is possible to see the image of the partner's rare item piece only when the link strength varying with the distance between the players, etc. is equal to or more than a predetermined value. This allows the player to know exactly what is the rare item piece possessed by the communication partner. Also, the player can learn easily that the use of the both normal item and rare item may be permitted, in a relationship with the communication partner.

In the example of FIG. 8, for instance, it can be found that a rare item piece 106*a* possessed by the parent apparatus and a rare item piece 106*b* possessed by the game apparatus 10 of the player 3 can be combined with each other, forming a set or a pair. Therefore, if the rare item piece 106*a* and the rare item piece 106*b* are selected for combination on the parent apparatus and the child apparatus of the player 3, respectively, it is possible to combine these pieces. By operating the predetermined operating switch 26, the player can select a rare item piece to be combined in its possession.

Figure 9:
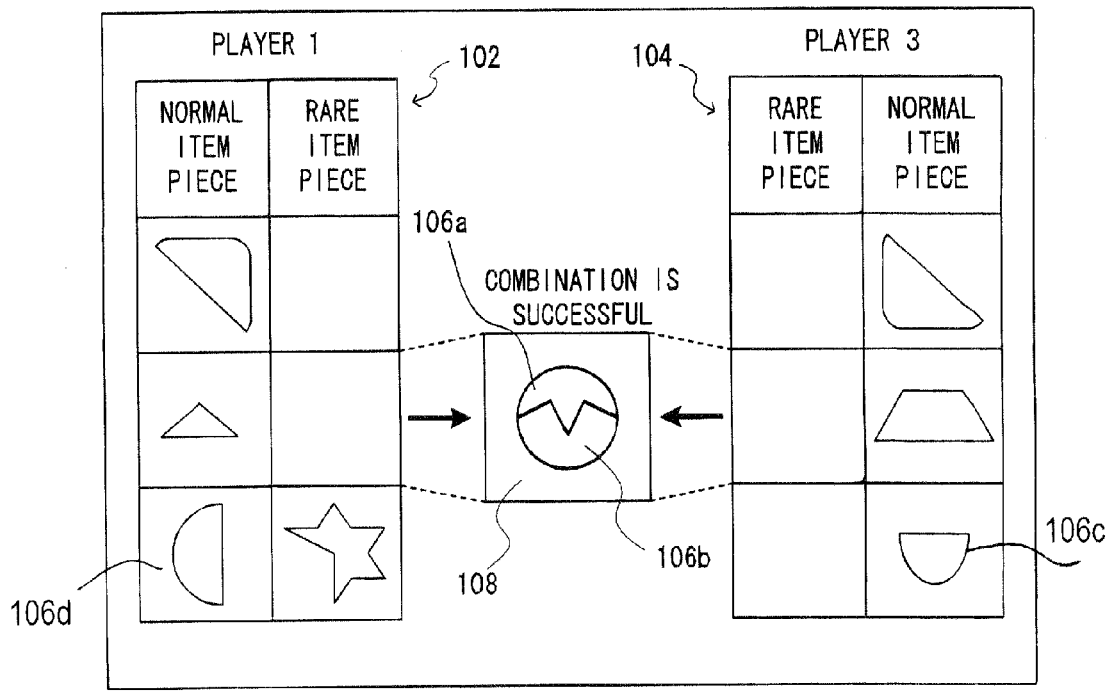
FIG. 9 is an illustrative view showing one example of a game screen displayed on the parent apparatus when item pieces are successfully combined, following FIG. 8.

FIG. 9 shows one example of a game screen of the parent apparatus that indicates the state in which the item pieces are combined. For example, if the rare item piece 106*a* is selected on the parent apparatus, it is positioned in a combination place 108. Also, if the rare item piece 106*b* is selected on the child apparatus, it is positioned in the combination place 108. Information indicative of the item piece selected for combination is transmitted to each other's partner apparatus. This makes it possible to display a game screen indicating the state in which the item piece selected for combination on the partner apparatus is positioned in the combination place. Then, the parent apparatus, for example, determines whether or not the item pieces selected on the parent apparatus and the child apparatus can be combined with each other. More specifically, the parent apparatus determines whether or not the two pieces are of the same kind of item (rare item or normal item) and whether or not they make up a set. If determined that the two pieces can be combined with each other, the parent apparatus transmits information indicative of successful combination to the child apparatus. Then, the use of the rare item is permitted and an event based on the rare item takes place on the parent apparatus and the child apparatus, for example.

As described above, in this embodiment, the use of a normal item alone is permitted if the link strength is not equal to or more than a predetermined value, and both the use of a normal item and the use of a rare item are permitted if the link strength is equal to or more than a predetermined value, which makes it possible to change the game details according to the distance between the game apparatuses 10, etc. Also, it is possible to enhance the rarity of the use of a rare item in comparison with the use of a normal item.

In addition, as for a rare item, if the link strength is equal to or more than a predetermined value and a rare item piece is selected on the partner's game apparatus 10 in correspondence with the rare item piece selected on this game apparatus itself, the use of the rare item is permitted. This makes it possible to change the game details not only according to the distance from the partner's game apparatus but also by each other's mutual action, thereby further making the game more interesting.

Figures 10, 11:
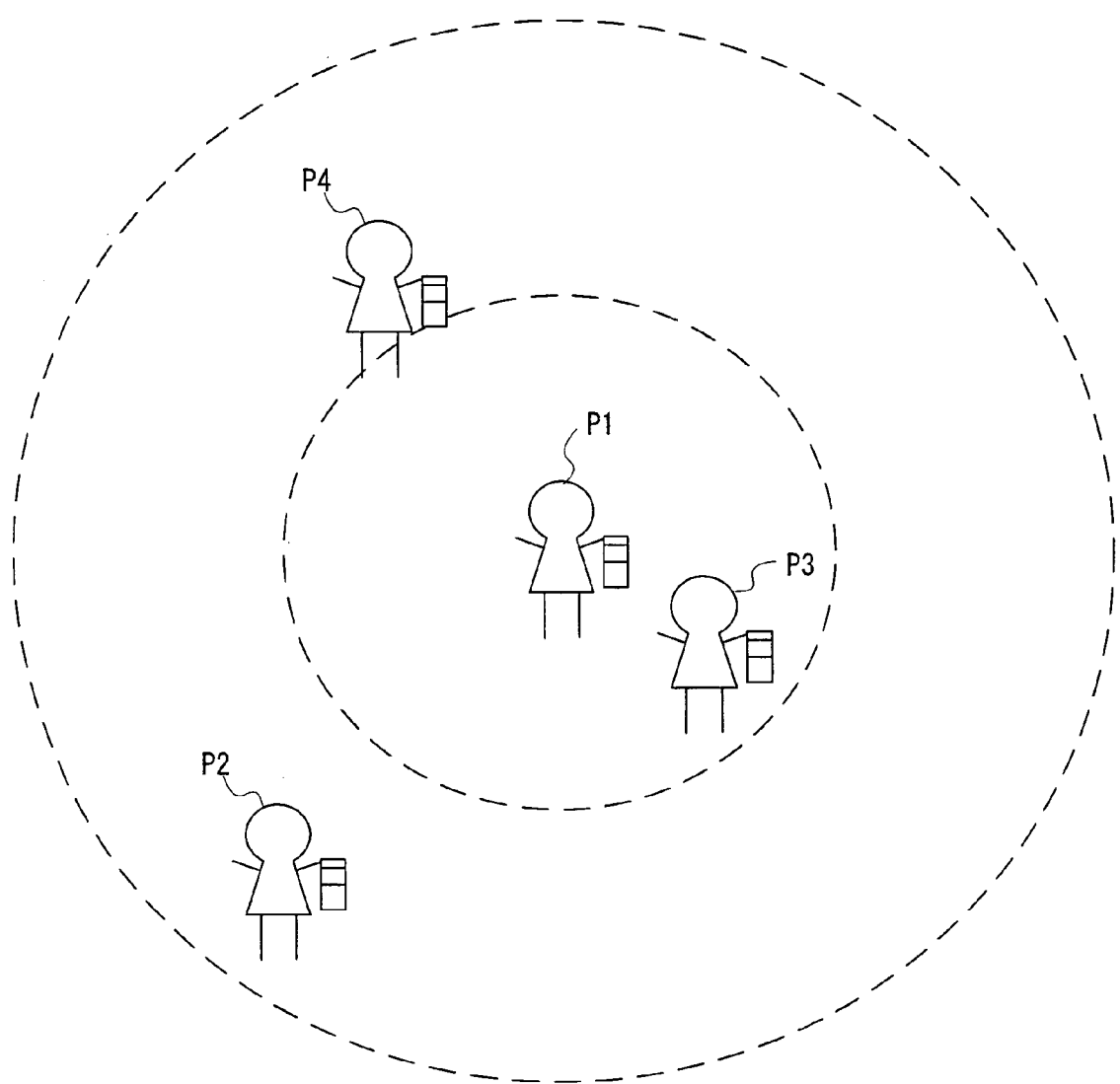
FIG. 10 is an illustrative view showing one example of positional relationships among players corresponding to FIGS. 6 to 9.
FIG. 11 is an illustrative view showing one example of contents of communication data.

FIG. 10 shows positional relationships among the players corresponding to the game screens shown in FIG. 6 to FIG. 9. In FIG. 10, the players 1 to 4 are indicated with reference numerals P1 to P4, and the outer circle shown by a dotted line denotes a communicable range for the parent apparatus of the player 1. Also, the inner circle shown by a dotted line means a region in which the link strength equal to or more than a predetermined value may be detected on the parent apparatus. Since the player 2 exists outside the inner circle, the link strength less than the predetermined value is detected between the parent apparatus and the game apparatus 10 of the player 2. Thus, if the player 2 is selected as a communication partner, the game screen of the parent apparatus does not display the image of the rare item piece possessed by the player 2, as shown in FIG. 7. Also, the use of the rare item is not permitted for the parent apparatus and the game apparatus 10 of the player 2.

On the other hand, since the player 3 exists within the inner circle, the link strength equal to or more than the predetermined value is detected between the parent apparatus and the game apparatus 10 of the player 3. Therefore, if the player 3 is selected as a communication partner, the game screen of the parent apparatus displays the image of the rare item piece possessed by the player 3, as shown in FIG. 8. Also, there is a possibility that the use of the rare item may be permitted for the parent apparatus and the game apparatus 10 of the player 3.

Besides, the player 4 has no rare item in his possession (see FIG. 6), and thus if the player 4 is selected as a communication partner, the game screen of the parent apparatus displays only the image of the normal item piece possessed by the player 4.

FIG. 11 shows one example of the contents of communication data. The parent apparatus transmits such communication data (parent communication data) to the child apparatus, and the child apparatus transmits such communication data (child communication data) to the parent apparatus. The communication data includes possessed item list data. The possessed item list data contains information on normal item piece(s) and rare item piece(s) possessed by this game apparatus itself. For example, such information is identification information on possessed item piece(s). Otherwise, such information is flag data indicative of the possession or non-possession of all the item pieces. The possessed item list data contained in the communication data is generated on the basis of the data in the possessed item list area 84 of the WRAM 48. The parent apparatus and child apparatuses can each determine whether or not any rare item is possessed by the game apparatus 10 of the communication partner, based on the received possessed item list data. In addition, based on the results of the determination, these apparatuses can display the status of possession of rare item(s) by the game apparatus 10 of the communication partner, as shown in FIG. 6, for example.

Moreover, the communication data may include displayed item list data. The displayed item list data contains information on the item pieces to be displayed, as the item pieces possessed by this game apparatus itself, in the partner's item display portion 104 of the communication partner. For example, such information is identification information on predetermined numbers of normal item pieces and rare item pieces. The displayed item list data contained in the communication data is generated on the basis of the data in the displayed item list area 86 of the WRAM 48. The parent apparatus and child apparatuses can each decide a predetermined number of item pieces to be displayed in the partner's item display portion 104, based on the received displayed item list data.

Furthermore, the communication data may include selected item piece data. The selected item piece data contains information (identification information) indicative of an item piece selected for combination. The selected item piece data contained in the communication data is generated on the basis of the data in the selected item piece area 88 of the WRAM 48. The parent apparatus and the child apparatuses can each know the item piece selected for combination in the partner's game apparatus 10 based on the received selected item piece data, and can each generate and display a game screen indicating that the item piece is selected for combination. Also, in this embodiment, since a determination on item combination is carried out on the parent apparatus, the parent apparatus can determine whether the item combination is successful or unsuccessful based on the selected item piece data received from the partner's apparatus and the selected item piece data of the WRAM 48 of this game apparatus itself.

Figure 12:
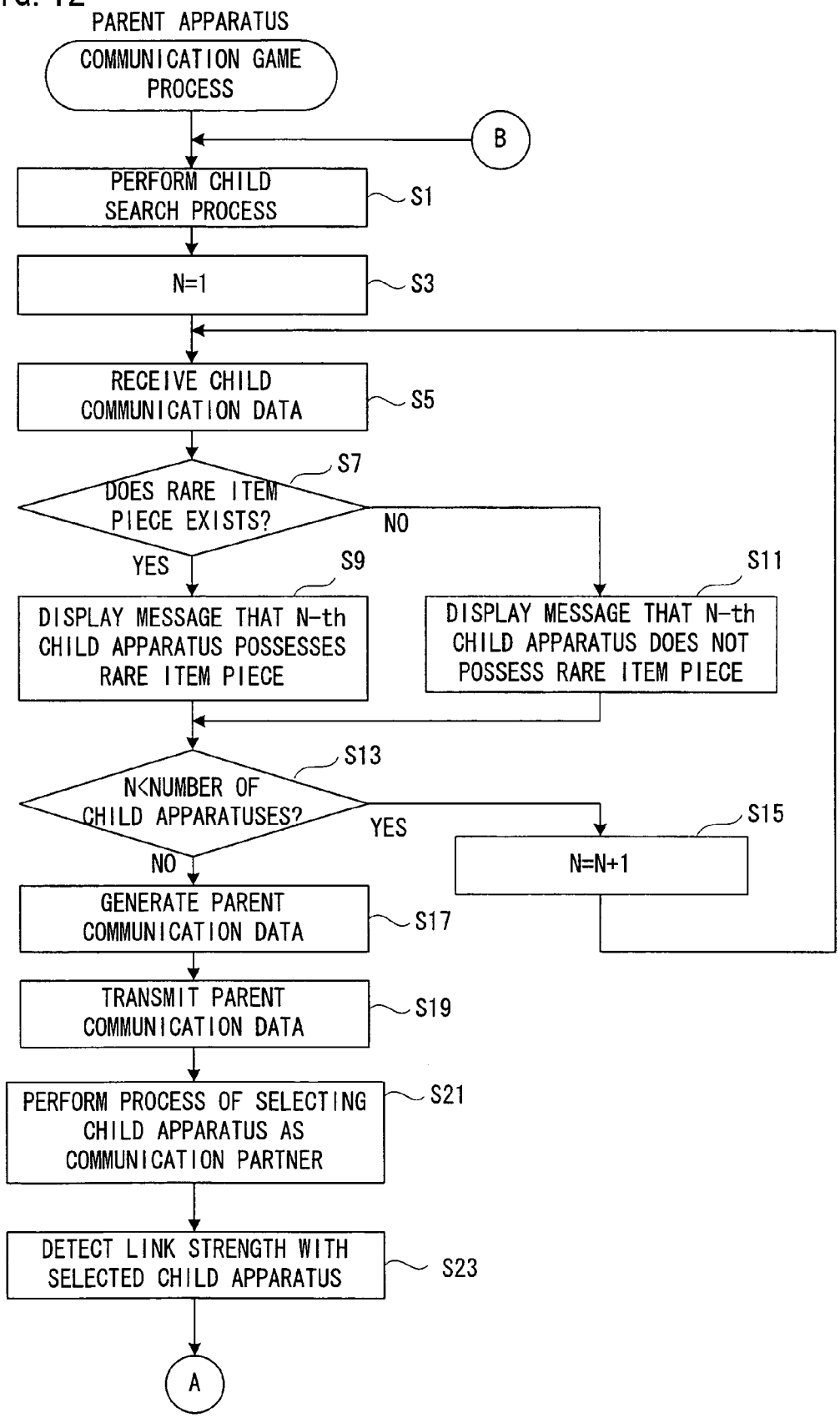
FIG. 12 is a flowchart showing one example of operation of a communication game process in the parent apparatus.
Figure 13:
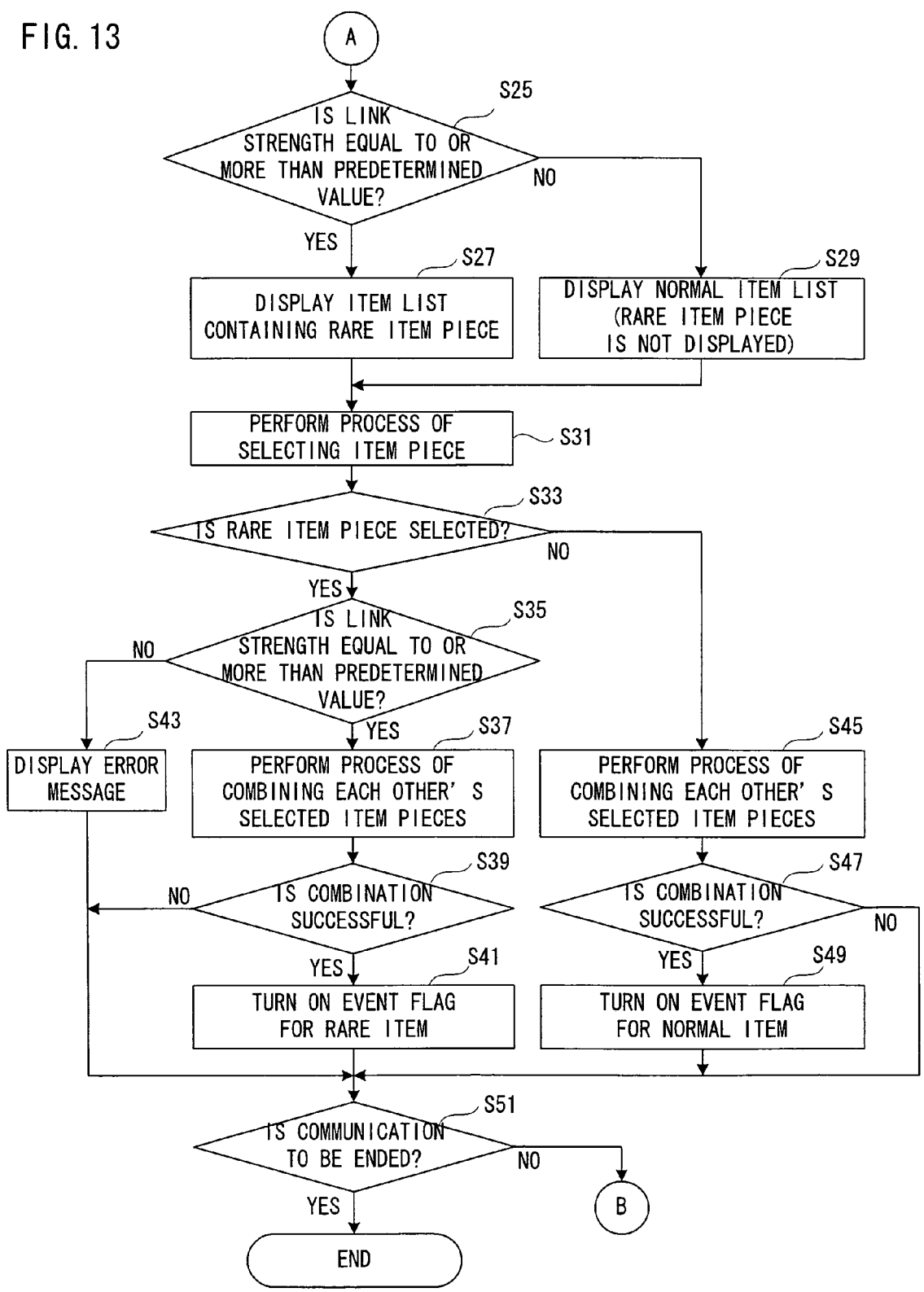
FIG. 13 is a flowchart showing one example of the operation continued from FIG. 12.

FIG. 12 and FIG. 13 show one example of operation of communication game process by the parent apparatus in this game system. In a first step SI of FIG. 12, the CPU core 42 of the parent apparatus executes a child apparatus search process to search for any child apparatus existing in the communicable range and establishes a connection with the child apparatus. By this process, the parent apparatus is connected to a predetermined maximum number of connectable child apparatuses (three units, for example) or less.

Next, in a step S3, the CPU core 42 sets a variable N to an initial value "1". Then, in a step S5, the CPU core 42 receives child communication data from the child apparatus via the wireless communication unit 16 and stores it as communication data from the N-th child apparatus in the partner's item data area 94 of the WRAM 48. The child communication data contains the possessed item list data of the child apparatus.

Subsequently, in a step S7, the CPU core 42 determines whether or not the items possessed by the child apparatus include any rare item piece, based on the received child communication data. If "YES", the CPU core 42 displays on the LCD 24 a message to the effect that the N-th child apparatus possesses a rare item piece in a step S9. More specifically, the CPU core 42 renders in the VRAM 50 a game screen indicating that the player of the N-th child apparatus possesses the rare item piece, and displays the game screen on the LCD 24 by means of the LCD controller 46. On the other hand, if "NO" in the step S7, the CPU core 42 displays on the LCD 24 a message to the effect that the N-th child apparatus has no rare item in its possession. More specifically, the CPU core 42 renders in the VRAM 50 a game screen indicating that the player of the N-th child apparatus possesses no rare item piece, and displays the game screen on the LCD 24 by means of the LCD controller 46.

Then, in a step S113, the CPU core 42 determines whether the value of the variable N is smaller or not than the number of the connected child apparatuses. That is, the CPU core 42 ascertains the status of possession of a rare item for all the connected child apparatuses and determines whether the results of the possession are displayed or not. If "YES" in the step S13, the CPU core 42 adds "1" to the variable N in a step S15 and returns to the step S5. As stated above, the possession or non-possession of a rare item is ascertained for all the child apparatuses existing in the communicable range, and the selection screen containing the status of possession of a rare item by each child apparatus is displayed on the LCD 24 as shown in FIG. 6.

On the other hand, if "NO" in the step S13, the CPU core 42 generates the parent communication data containing the possessed item list data of the parent apparatus based on the data in the possessed item list area 84 in a step S17, and transmits the parent communication data by means of the wireless communication unit 16 in a step S19.

In a step S21, the CPU core 42 executes a process of selecting a child apparatus as a communication partner. In this process, the CPU core 42 acquires operational input data from the operating switch 26 of the parent apparatus, and decides the child apparatus as a communication partner from one or a plurality of connected child apparatuses. The parent apparatus generates parent communication data including data indicative of the child apparatus selected as a communication partner, and transmits it to each of the child apparatuses. This allows each of the child apparatuses to know whether the child apparatus itself is selected or not as a communication partner by the parent apparatus.

Then, in a step S23, the CPU core 42 detects the link strength for wireless communication with the child apparatus selected as a communication partner. Also, although not illustrated here, the parent apparatus transmits to the child apparatus the parent communication data containing the possessed item list and the displayed item list. The parent apparatus also receives the child communication data containing the possessed item list and the displayed item list from the child apparatus, and stores it in the partner's item data area 94.

Then, in a next step S25 of FIG. 13, the CPU core 42 determines whether or not the detected link strength is equal to or more than the predetermined value. If "YES" in the step S25, the CPU core 42 displays the item list containing rare item pieces in a step S27. More specifically, based on the data in the possessed item list area 84, the communication partner's possessed item list data and displayed item list data in the partner's item data area 94, the image data in the image data storage area 72, etc., the CPU core 42 renders in the VRAM 50 a game screen containing the own item display portion 102 and the partner's item display portion 104, and displays the game screen on the LCD 24 by means of the LCD controller 46. That is, if the child apparatus has a rare item in its possession, the game screen displays the image of the rare item piece in the partner's item display portion 104, as shown in FIG. 8.

On the other hand, if "NO" in the step S25, the CPU core 42 displays the normal item list in a step S29. More specifically, based on the data in the possessed item list area 84, the data related to normal item piece out of the partner's possessed item list data and displayed item list data in the partner's item data area 94, the image data in the image data storage area 72, etc., the CPU core 42 renders in the VRAM 50 a game screen containing the own item display portion 102 and the partner's item display portion 104, and displays the game screen on the LCD 24 by means of the LCD controller 46. That is, as shown in FIG. 7, the game screen does not display the image of a rare item piece in the partner's item display portion 104 even if the child apparatus has the rare item piece in its possession. The player of the parent apparatus sees the game screen in which item pieces possessed by this game apparatus itself and the child apparatus are displayed, and selects an item piece of its own to be combined.

Then, in a step S31, the CPU core 42 executes a process of selecting an item piece. In this process, the CPU core 42 obtains operational input data from the operating switch 26. If predetermined operational input data for specifying a change in item pieces displayed in the own item display portion 102 is provided, the displayed item list area 86 is updated on the basis of the operational input data. Then, in the game screen, the change is made to the item pieces displayed in the own item display portion 102, based on the data in the displayed item list area 86. Also, if predetermined operational input data for specifying the selection of an item piece for combination is provided, the identification information on the selected item piece is stored in the selected item piece area 88 on the basis of the operational input data. In addition, the child communication data is received from the child apparatus and stored in the partner's item data area 94. In the game screen, the change is made to the items displayed in the partner's item display portion 104, based on the displayed item list data in the partner's item data area 94.

Following that, in a step S33, the CPU core 42 determines whether the selected item piece is a rare item piece or not. If "YES" in the step S33, the CPU core 42 determines whether or not the link strength is equal to or more than the predetermined value in a step S35. That is, in this embodiment, since the use of a rare item is not permitted unless the link strength is equal to or more than the predetermined value, the CPU core 42 determines based on the link strength whether or not the rare item can be selected for combination.

If "YES" in the step S35, the CPU core 42 executes a process of combining each other's selected item pieces in a step S37. In this process, the CPU core 42 receives the child communication data from the child apparatus, obtains the data indicative of the item piece selected on the child apparatus contained in the child communication data and stores it in the partner's item data area 94. Then, the CPU core 42 determines whether or not the rare item piece selected on this game apparatus itself stored in the selected item piece area 88 corresponds to the item piece selected on the child apparatus stored in the partner's item data area 94, that is, the two item pieces make up a set or a pair.

Subsequently, in a step S39, the CPU core 42 determines whether the combination is successful or not. If "YES", the CPU core 42 permits the use of the combined rare item and turns on the event flag for rare item in a step S41. This causes an event for rare item on the parent apparatus. In addition, the CPU core 42 generates the parent communication data including data indicative of the successful rare item combination and transmits it to the child apparatus.

On the other hand, if "NO" in the step S39, that is, if the item pieces selected on the parent apparatus and the child apparatus do not correspond to each other, the CPU core 42 displays in the game screen a message to the effect that the combination is unsuccessful, for example, and moves to a step S51. Additionally, the CPU core 42 generates parent communication data including data indicative of the unsuccessful rare item combination and transmits it to the child apparatus.

In contrast, if "NO" in the step S35, that is, if the selection of the rare item is not permitted, the CPU core 42 executes a process of displaying an error message in a step S43 and goes to the step S51. By this process of the step S43, generated and displayed is a game screen indicating that the rare item piece the player attempts to select cannot be selected, for example.

Additionally, if "NO" in the step S33, that is, if the normal item piece is selected, the CPU core 42 executes a process of combining each other's selected item pieces in a step S45. This process is performed in the same manner as that in the step S37. More specifically, the CPU 42 receives the child communication data from the child apparatus and stores data indicative of the item piece selected on the child apparatus in the partner's item data area 94. Then, the CPU core 42 determines whether or not the normal item piece selected on this game apparatus itself stored in the selected item piece area 88 corresponds to the item piece selected on the child apparatus stored in the partner's item data area 94, that is, the two pieces make up a set or a pair.

Then, in a step S47, the CPU core 42 determines whether the combination is successful or not. If "YES", the CPU core 42 permits the use of the combined normal item and turns on the event flag for normal item in a step S49. This causes an event for normal item on the parent apparatus. Also, the CPU core 42 generates parent communication data including data indicative of the successful normal item combination and transmits it to the child apparatus.

On the other hand, if "NO" in the step S47, the CPU core 42 displays in the game screen a message to the effect that the combination is unsuccessful, for example, and goes to the step S51. Besides, parent communication data including data indicative of the unsuccessful normal item combination is generated and transmitted to the child apparatus.

Then, in the step S51, the CPU core 42 determines whether or not to end the communication. If the player has specified the continuation of the communication by operating the operating switch 26, for example, the CPU core 42 determines that the communication is not to be terminated. If "NO" in the step S51, that is, if the communication game is to be continued, the CPU core 42 returns to the step S1 of FIG. 12 to repeat the processes. On the other hand, if "YES" in the step S51, the CPU core 42 terminates the communication game process.

Figure 14:
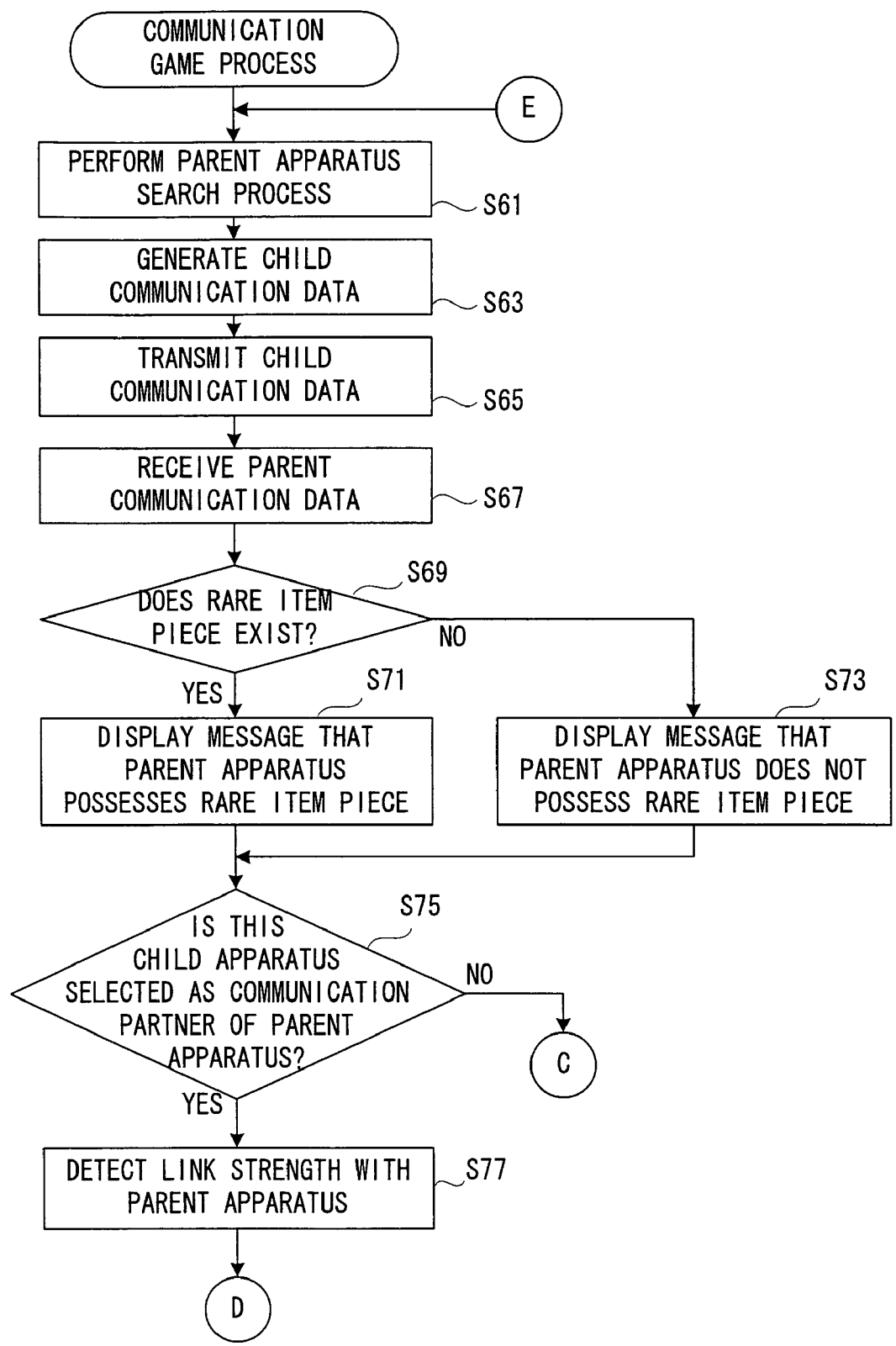
FIG. 14 is a flowchart showing one example of operation of a communication game process in a child apparatus.
Figure 15:
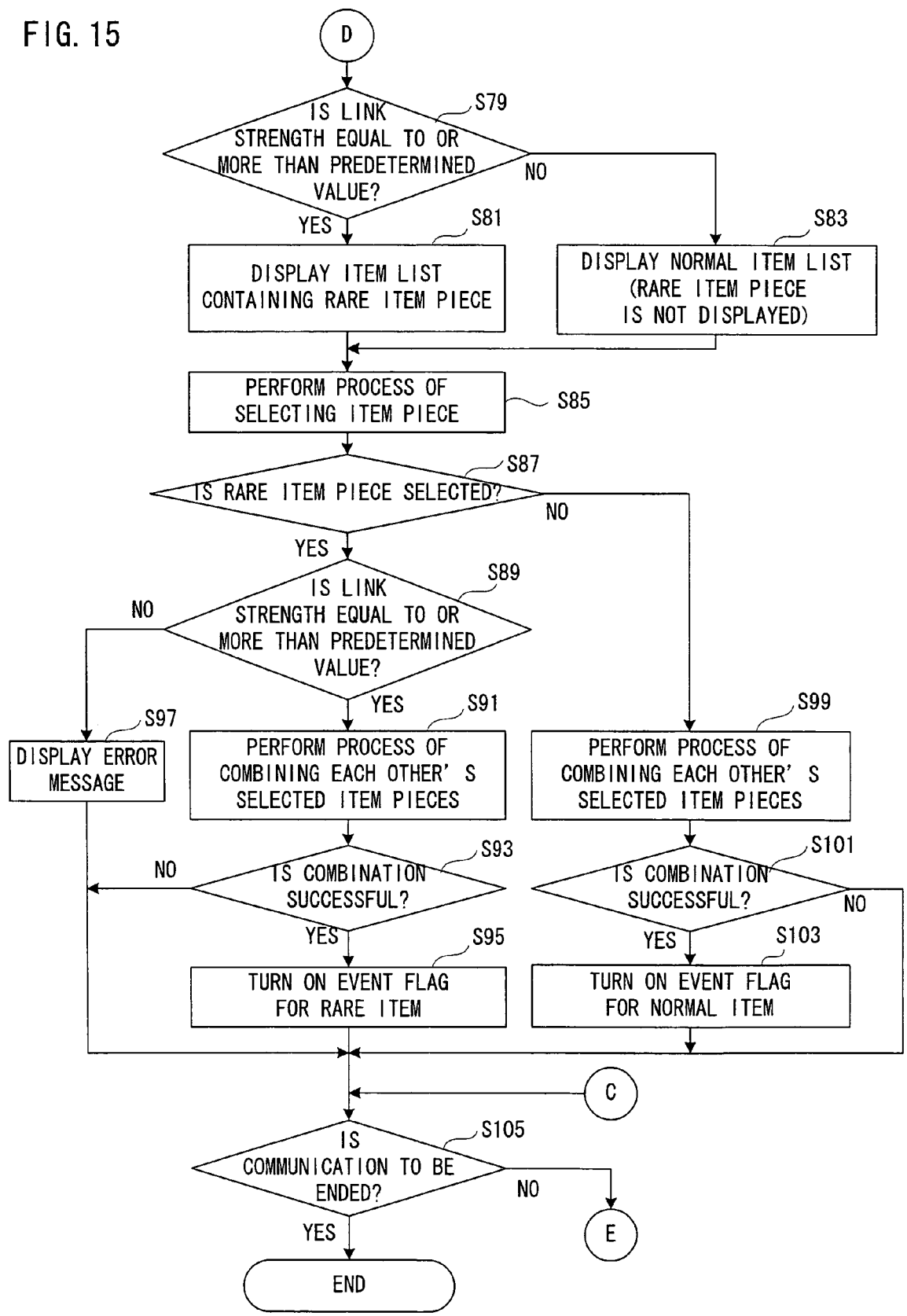
FIG. 15 is a flowchart showing one example of the operation continued from FIG. 14.

FIG. 14 and FIG. 15 show one example of operation of communication game process by the child apparatus. In a first step S61 of FIG. 14, the CPU core 42 executes a parent search process to search for a parent apparatus existing within a communicable range and establishes connection with the parent apparatus.

Next, the CPU core 42 generates child communication data including the possessed item list data based on the data in the possessed item list area 84 in a step S63, and transmits the child communication data to the parent apparatus by means of the wireless communication unit 16. This allows the parent apparatus to know the status of possession of item pieces in the child apparatus.

Subsequently, in a step S67, the CPU core 42 receives the parent communication data by means of the wireless communication unit 16 and stores it in the partner's item data area 94 of the WRAM 48. The parent communication data contains the possessed item list data of the parent apparatus.

Then, in a step S69, the CPU core 42 determines whether or not the items possessed by the parent apparatus include any rare item piece, based on the received parent communication data. If "YES" in the step S69, the CPU core 42 renders in the VRAM 50 a game screen indicating that the parent apparatus has a rare item in its possession, and displays the game screen on the LCD 24 by means of the LCD controller 46 in a step S71. On the other hand, if "NO" in the step S69, the CPU core 42 displays on the LCD 24 a game screen indicating that the parent apparatus has no rare item in its possession.

Subsequently, in a step S75, the CPU core 42 determines whether this apparatus is selected or not as the parent apparatus' communication partner. More specifically, the CPU core 42 receives the parent communication data including data indicative of the child apparatus selected as a communication partner, and determines based on the received data whether this game apparatus is selected or not as a communication partner. If "NO" in the step S75, the CPU core 42 moves to a next step S105 of FIG. 15.

On the other hand, if "YES" in the step S75, the CPU core 42 detects the link strength for wireless communication with the parent apparatus in a step S77. Also, although not illustrated here, the child apparatus receives the parent communication data including the possessed item list and the displayed item list from the parent apparatus, and stores it in the partner's item data area 94. In addition, the child apparatus generates the child communication data containing the possessed item list and the displayed item list, and transmits it to the parent apparatus.

Then, in a next step S79 of FIG. 15, the CPU core 42 determines whether or not the detected link strength is equal to or more than the predetermined value. If "YES" in the step S79, the CPU core 42 displays an item list containing rare item pieces in a step S81. This process is carried out in the same manner as that of the parent apparatus in the above described step S27. Thus, the game screen displays the image of a rare item in the partner's item display portion 104 if the parent apparatus has the rare item in its possession.

On the other hand, if "NO" is the step S79, the CPU core 42 displays the normal item list in a step S83. This process is carried out in the same manner as that of the parent apparatus in the above described step S29. Accordingly, the game screen does not display the image of the rare item piece in the partner's item display portion 104 even if the parent apparatus has the rare item in its possession. The player of the child apparatus sees the game screen in which the items possessed by the child apparatus itself and the parent apparatus are displayed, and selects an item piece of its own to be combined.

Then, in a step S85, the CPU core 42 executes a process of selecting the item piece. This process is carried out in the same manner as that of the parent apparatus in the above described step S31. For example, if predetermined operational input data for specifying the selection of an item piece for combination is provided, the CPU core 42 stores identification information on the selected item piece in the selected item piece area 88, based on the operational input data.

Subsequently, in a step S87, the CPU core 42 determines whether the selected item piece is a rare item piece or not. If "YES" in the step S87, the CPU core 42 determines the link strength is equal to or more than the predetermined value in a step S89. That is, since the use of a rare item is not permitted if the link strength is not equal to or more than the predetermined value, the CPU core 42 determines based on the link strength whether or not the rare item can be selected for combination.

If "YES" in the step S89, the CPU core 42 executes a process of combining each other's selected item pieces in a step S91. In this process, the CPU core 42 generates child communication data including data indicative of the rare item piece selected on the child apparatus itself, and transmits it to the parent apparatus. The CPU core 42 also receives the parent communication data from the parent apparatus, and obtains data indicating whether the combination is successful or unsuccessful, which is included in the parent communication data. The success or failure of the rare item combination is determined on the basis of the received data.

Subsequently, in a step S93, the CPU core 42 determines whether the combination is successful or not. If "YES", the CPU core 42 permits the use of the combined rare item and turns on the event flag for rare item in a step S95. This causes an event for rare item on the child apparatus. On the other hand, if "NO" in the step S93, the CPU core 42 displays in the game screen a message to the effect that the combination is unsuccessful, for example, and moves to a step S105.

Besides, if "NO" in the step S89, that is, if the selection of the rare item is not permitted, the CPU core 42 performs a process of displaying an error message in a step S97 and goes to a step S105. By this process of step S97, the game screen displays a message to the effect that the rare item piece the player attempts to select cannot be selected, for example.

In addition, if "NO" in the step S87, that is, if a normal item piece is selected, the CPU core 42 executes a process of combining each other's selected item pieces in a step S99. In this process, the CPU core 42 generates child communication data including data indicative of the normal item piece selected on the child apparatus itself, and transmits it to the parent apparatus. Also, the CPU core 42 receives the parent communication data from the parent apparatus and obtains data indicating whether the combination is successful or unsuccessful, which is included in the parent communication data. The success or failure of the normal item combination is determined on the basis of the received data.

Then, in a step S101, the CPU core 42 determines whether the combination is successful or not. If "YES", the CPU core 42 permits the use of the combined normal item and turns on the event flag for normal item in a step S103. This causes an event for normal item on the child apparatus. On the other hand, if "NO" in the step S101, the CPU core 42 displays in the game screen a message to the effect that the combination is unsuccessful, for example, and moves to the step S105.

Then, in the step S105, the CPU core 42 determines whether or not to terminate the communication. If the player has specified the continuation of the communication by operating the operating switch 26, for example, the CPU core 42 determines that the communication is not to be ended. If "NO" in the step S105, that is, the communication game is to be continued, the CPU core 42 returns to the step S61 of FIG. 14 to repeat the processes. On the other hand, if "YES" in the step S105, the CPU core 42 terminates the communication game process.

According to this embodiment, since the use of a rare item is permitted when the link strength varying in accordance with the distance between the game apparatuses 10, etc. is equal to or more than a predetermined value, it is possible to change the possibility of the use of an item according to the distance from the game apparatus 10 as a wireless communication partner and the status of the communication with the same. This makes it possible to produce a change in the game details according to the distance between the game apparatuses 10, etc. and provide the highly innovative and interesting game. Also, unless the link strength is equal to or more than a predetermined value, the use of a rare item is not permitted and thus an event due to the use of the rare item does not take place, resulting in increased rarity of the rare item. For example, the player can play a communication game, taking into account the distance from the partner's game apparatus 10. That is, if the player finds a communication partner with whom the image of a rare item piece is not displayed, in other words, with whom the use of the rare item is not permitted, the player may play the game in an aggressive manner by approaching the partner to decrease the distance between the two for permission of the use of the rare item.

Besides, in the above described embodiment, the image of the partner's rare item piece is displayed if the link strength is equal to or more than the predetermined value, as shown in FIG. 8, and the image of the partner's rare item piece is not displayed if the link strength is not equal to or more than the predetermined value, as shown in FIG. 7. That is, display or non-display of a rare item piece is determined according to the link strength. However, as in another embodiment shown in FIG. 16, the image of the partner's rare item piece may be displayed even if the link strength is not equal to or more than the predetermined value.

Figure 16:
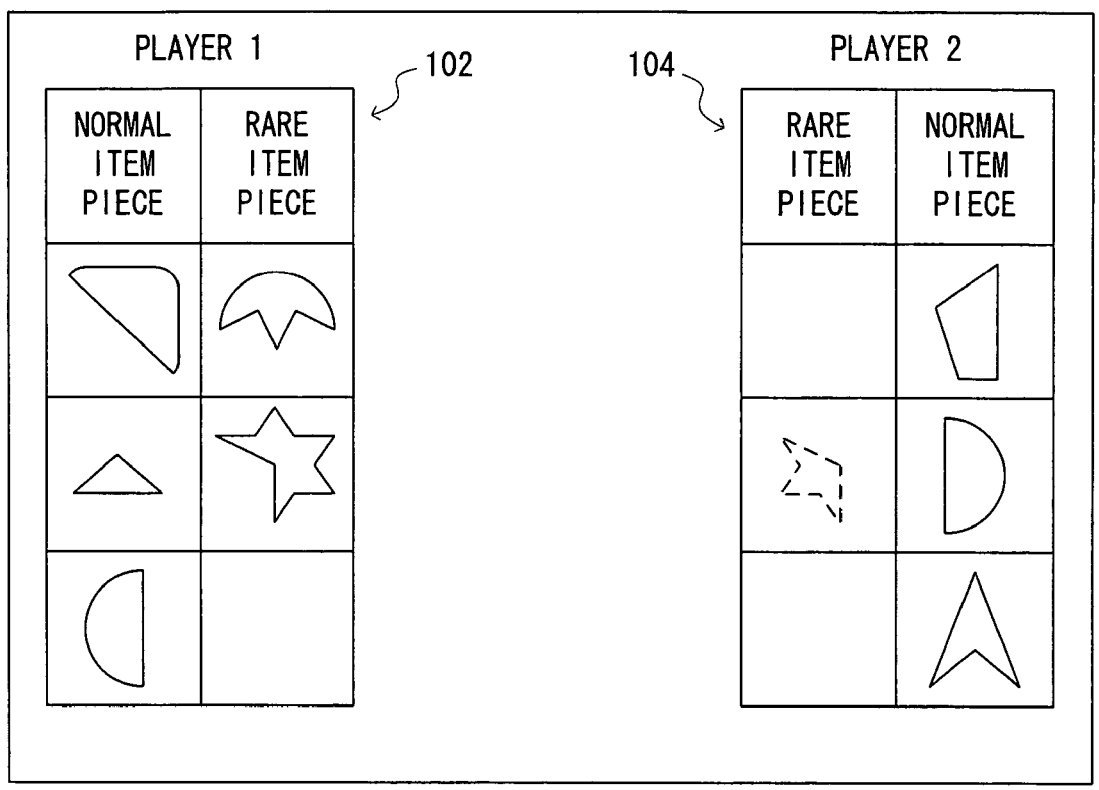
FIG. 16 is an illustrative view showing one example of a game screen displayed on the parent apparatus in the case where a link strength for communication with the partner is not equal to or more than the predetermined value in another embodiment.

FIG. 16 shows one example of a game screen that is displayed in the case where the strength of a link with the communication partner is not equal to or more than a predetermined value in the other embodiment. Displayed in the partner's item display portion 104 is the image of the rare item piece possessed by the player 2. Although the image of the rare item piece is indicated by a dotted line in FIG. 16, it is to be displayed in the actual game screen in an unusual state, for example, in a translucent manner or in a predetermined color (gray, etc.). This allows the player 1 of the parent apparatus to easily know that the use of the rare item is not permitted in a relationship with the player 2, as in the above mentioned embodiment. Incidentally, even though the link strength is actually not equal to or more than the predetermined value, the image of a rare item piece may be displayed in the same state as in the case where the link strength is equal to or more than the predetermined value.

Figure 17:
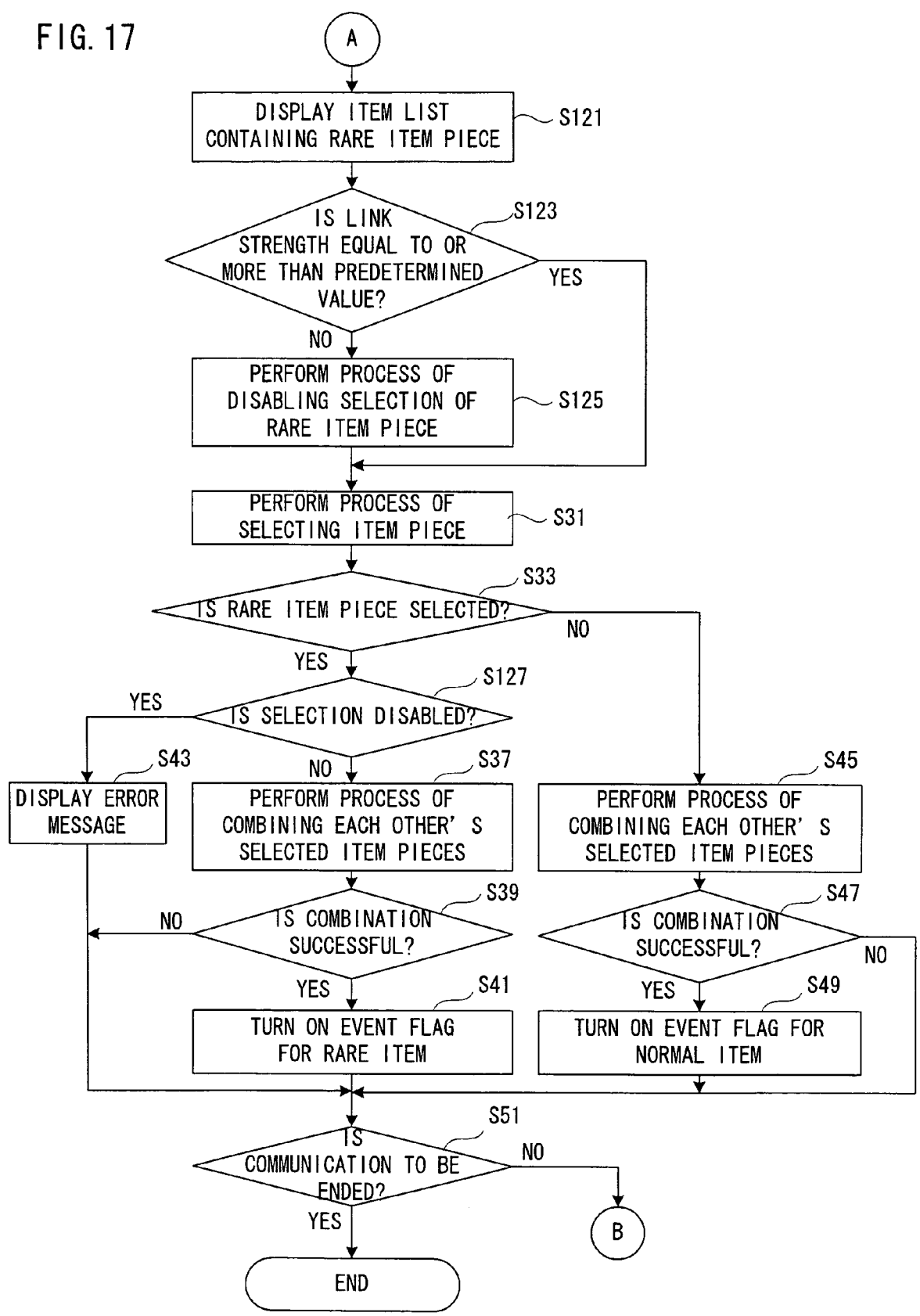
FIG. 17 is a flowchart showing one example of operation of the communication game process in the parent apparatus of the FIG. 16 embodiment and continued from FIG. 12.

FIG. 17 shows one example of game operation of the parent apparatus that is continued from FIG. 12 in the FIG. 16 embodiment. In FIG. 17, new reference numerals are given to the steps different from those in the above stated embodiment shown in FIG. 13, and the same reference numerals are provided to the same steps as those in FIG. 13, with an omission of descriptions on these steps.

After detecting the link strength in the step S23 of FIG. 12, the CPU core 42 displays an item list containing rare item pieces in a first step S121 of FIG. 17. This is the same process as that is the step S27 of the above mentioned embodiment. With this, the CPU core 42 renders a game screen containing the normal item piece(s) and the rare item piece(s) in the partner's item display portion 104 on the basis of the received child communication data, and displays the game screen on the LCD 24.

Subsequently, in a step S123, the CPU core 42 determines whether or not the detected link strength is equal to or more than the predetermined value. If "NO" in the step S123, the CPU core 42 executes a process of disabling the selection of the rare item piece in a step S125. More specifically, the CPU core 42 turns on a rare item piece selection disabling flag in the predetermined area of the WRAM 48. In addition, the image of the rare item piece to be displayed in the partner's item display portion 104 may be displayed in a different form, for example, in a translucent manner or in a predetermined color. On the other hand, if "YES" in the step S123, the CPU core 42 goes directly to the step S31.

Also, if it has determined that the rare item is selected in the step S33, the CPU core 42 determines in a succeeding step S127 whether the rare item cannot be selected or not. For example, the CPU core 42 determines whether or not the rare item piece selection disabling flag is turned on. If "NO" in the step S127, the CPU core 42 goes to the step S37. If "YES", the CPU core 42 moves to the step S43.

Figure 18:
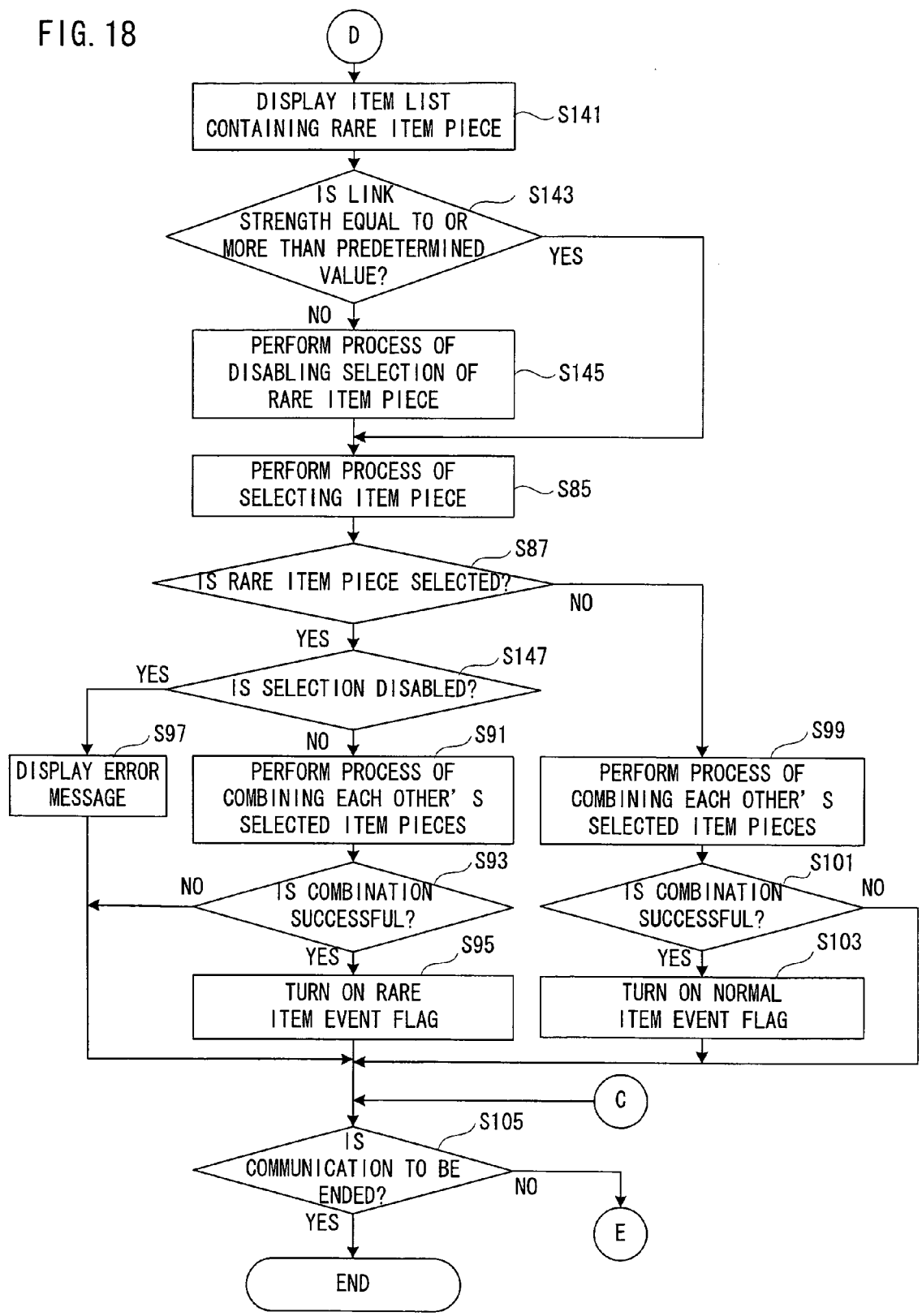
FIG. 18 is a flowchart showing one example of operation of the communication game process in the child apparatus of the FIG. 16 embodiment and continued from FIG. 14.

FIG. 18 shows one example of game operation of the child apparatus which is continued from FIG. 14 in the FIG. 16 embodiment. In FIG. 18, new reference numerals are given to the steps different from those in the above stated embodiment shown in FIG. 15, and the same reference numerals are provided to the same steps as those in FIG. 15, with an omission of descriptions on these steps.

After detecting the link strength in the step S77 of FIG. 14, the CPU core 42 displays an item list containing rare item pieces in a first step S141 of FIG. 18. This is the same process as that is the step S81 of the above mentioned embodiment. With this, the CPU core 42 renders a game screen containing the normal item piece(s) and the rare item piece(s) in the partner's item display portion 104 on the basis of the received parent communication data, and displays the game screen on the LCD 24.

Subsequently, in a step S143, the CPU core 42 determines whether or not the detected link strength is equal to or more than the predetermined value. If "NO" in the step S143, the CPU core 42 executes a process of disabling the selection of the rare item piece in a step S145. More specifically, the CPU core 42 turns on the rare item piece selection disabling flag in the predetermined area of the WRAM 48. In addition, the image of the rare item piece to be displayed in the partner's item display portion 104 may be displayed in a different form, for example, in a translucent manner or in a predetermined color. On the other hand, if "YES" in the step S143, the CPU core 42 moves directly to the step S85.

Also, if determined that the rare item piece is selected in the step S87, the CPU core 42 determines in a succeeding step S147 whether or not the rare item piece cannot be selected. For example, the CPU core 42 determines whether or not the rare item piece selection disabling flag is turned on. If "NO"

in the step S147, the CPU core 42 goes to the step S91. If "YES", it goes to the step S97.

According to the other embodiment, the image of the partner's rare item piece is displayed even if the link strength is not equal to or more than the predetermined value. This makes it possible to easily know what is the rare item piece possessed by the partner. In this case, it can be known whether the partner has the desired rare item piece in his possession even if the strength of a link with him is not equal to or more than the predetermined value. Thus, it is possible to easily inform the player of the need for playing the game in an aggressive manner, such as approaching the partner to increase the link strength to the predetermined value or more for permission of the use of the rare item piece.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system including a first game apparatus and at least a second game apparatus, the first game apparatus configured to carry out short-range wireless communication with said at least a second game apparatus, the system comprising:
   a first item data storage location provided in the first game apparatus to store item data including a first item of high rarity that is difficult for a player to obtain and a second item of low rarity that is easy for a player to obtain according to a progress of the game in at least the first game apparatus;
   a second item data storage location provided in said at least a second game apparatus to store item data including a first item of high rarity that is difficult for a player to obtain and a second item of low rarity that is easy for a player to obtain according to a progress of the game in at least the second apparatus;
   a link strength detector provided in the first game apparatus to detect a link strength for wireless communication between the first game apparatus and said at least a second game apparatus;
   strength value determining programmed logic circuitry provided in the first game apparatus to determine whether or not the link strength detected by said link strength detector is equal to or more than a predetermined value which is based on the communication link between the first game apparatus and said at least a second game apparatus; and
   game processing programmed logic circuitry provided in the first game apparatus to permit the use of said first item in the first game apparatus with respect to said first item in said at least a second game apparatus based on the progress of the game in said first game apparatus and in said at least a second game apparatus, while communication is maintained between the first game apparatus and said at least a second game apparatus, when said strength value determining programmed logic circuitry has determined that said link strength is equal to or more than the predetermined value,
   wherein the game processing programmed logic circuitry further does not permit the use of said first item in the first game apparatus with respect to said first item in said at least a second game apparatus, while communication is maintained between the first game apparatus and said at least a second game apparatus, when said strength value determining programmed logic circuitry has determined that said link strength is not equal to or more than the predetermined value, and
   wherein said game processing programmed logic circuitry permits the use of said second item alone in the first game apparatus when said strength value determining programmed logic circuitry has determined that said link strength is not equal to or more than the predetermined value, and permits the use of said first item in the first game apparatus with respect to said first item in said at least a second game apparatus and the use of said second item in the first game apparatus when said strength value determining programmed logic circuitry has determined that said link strength is equal to or more than the predetermined value.

2. A system according to claim 1, further comprising:
   possessed item receiving programmed logic circuitry provided in the first game apparatus to receive partner's possessed item data related to an item possessed by said at least a second game apparatus;
   possessed item determining programmed logic circuitry provided in the first game apparatus to determine whether or not said at least a second game apparatus possesses the first item based on said partner's possessed item data; and
   possession state displaying programmed logic circuitry provided in the first game apparatus to display a message to the effect that said at least a second game apparatus possesses the first item when said possessed item determining programmed logic circuitry has determined that said at least a second game apparatus possesses the first item.

3. A system according to claim 1, further comprising:
   possessed item receiving programmed logic circuitry provided in the first game apparatus to receive partner's possessed item data related to an item possessed by said at least a second game apparatus; and
   item display control programmed logic circuitry provided in the first game apparatus that displays an image of the first item possessed by said at least a second game apparatus based on said partner's possessed item data when said strength value determining programmed logic circuitry has determined that said link strength is equal to or more than the predetermined value, and that does not display the image of the first item possessed by said at least a second game apparatus when said strength value determining programmed logic circuitry has determined that said link strength is not equal to or more than the predetermined value.

4. A system according to claim 1, further comprising:
   possessed item receiving programmed logic circuitry provided in the first game apparatus to receive partner's possessed item data related to an item possessed by said at least a second game apparatus; and
   item display control programmed logic circuitry provided in the first game apparatus that displays the images of both of the first item and the second item possessed by said at least a second game apparatus based on said partner's possessed item data when said strength value determining programmed logic circuitry has determined that said link strength is equal to or more than the predetermined value, and that displays the image of the second item alone possessed by said at least a second game apparatus based on said partner's possessed item data when said strength value determining programmed logic circuitry has determined that said link strength is not equal to or more than the predetermined value.

5. The system according to claim 1, wherein use of said first item occurs when said first item is matched with a first item possessed by said at least a second game apparatus.

6. A computer-readable storage medium storing a game program executed in a first game apparatus comprising at least one item data storage location to store item data including a first item of high rarity that is difficult for a player to obtain and a second item of low rarity that is easy for a player to obtain according to a progress of the game in at least the first game apparatus, said first game apparatus configured to carry out short-range wireless communication with at least a second game apparatus, wherein execution of said game program causes a processor of said first game apparatus to perform:

detecting a link strength for wireless communication between this game apparatus and said at least a second game apparatus;

determining whether or not the link strength detected by said detecting is equal to or more than a predetermined value which is based on the communication link between the first game apparatus and said at least a second game apparatus; and permitting the use of said first item in the first game apparatus with respect to a first item of high rarity that is difficult for a player to obtain in said at least a second game apparatus based on the progress of the game in said first game apparatus and in said at least a second game apparatus, while communication is maintained between the first game apparatus and said at least a second game apparatus, when said determining has determined that said link strength is equal to or more than the predetermined value and not permitting the use of said first item in the first game apparatus with respect to said first item in said at least a second game apparatus, while communication is maintained between the first game apparatus and said at least a second game apparatus, when said determining has determined that said link strength is less than the predetermined value, and wherein in said execution of said game program, the use of said second item alone in the first game apparatus is permitted when it is determined by said determining whether or not the link strength detected by said detecting is equal to or more than a predetermined value that said link strength is not equal to or more than the predetermined value, and the use of said first item in the first game apparatus with respect to said first item is said at least a second game apparatus and the use of said second item in the first game apparatus is permitted when it is determined by said determining whether or not the link strength detected by said detecting is equal to or more than a predetermined value that said link strength is equal to or more than the predetermined value.

7. A computer-readable storage medium storing a game program according to claim 6, wherein
  execution of said game program causes the processor of said first game apparatus to further perform:
    receiving partner's possessed item data related to an item possessed by said at least a second game apparatus;
    determining whether or not said at least a second game apparatus possesses the first item based on said partner's possessed item data; and
    displaying a message to the effect that said at least a second game apparatus possesses the first item when it is determined by said determining whether or not said at least a second game apparatus possesses the first item that said at least a second game apparatus possesses the first item.

8. A computer-readable storage medium storing a game program according to claim 6, wherein
  execution of said game program causes the processor of said first game apparatus to further perform:
    receiving a partner's possessed item data related to an item possessed by said other game apparatus; and
    displaying an image of the first item possessed by said at least a second game apparatus based on said partner's possessed item data when it is determined by said determining whether or not the link strength detected by said detecting is equal to or more than a predetermined value that said link strength is equal to or more than the predetermined value, and not displaying the image of the first item possessed by said at least a second game apparatus when it is determined by said determining whether or not the link strength detected by said detecting is equal to or more than a predetermined value that said link strength is not equal to or more than the predetermined value.

9. A computer-readable storage medium storing a game program according to claim 6, wherein
  execution of said game program causes the processor of said first game apparatus to further perform:
    receiving partner's possessed item data related to an item possessed by said at least a second game apparatus; and
    displaying the images of both of the first item and the second item possessed by said at least a second game apparatus based on said partner's possessed item data when it is determined by said determining whether or not the link strength detected by said detecting is equal to or more than a predetermined value that said link strength is equal to or more than the predetermined value, and displaying the image of the second item alone possessed by said at least a second game apparatus based on said partner's possessed item data when it is determined by said determining whether or not the link strength detected by said detecting is equal to or more than a predetermined value that said link strength is not equal to or more than the predetermined value.

10. The computer-readable storage medium according to claim 6, wherein use of said first item occurs when said first item is matched with a first item possessed by said at least a second game apparatus.

11. In a first game apparatus configured to carry out short-range wireless communication with at least one second game apparatus, said first game apparatus including a first item data storage location to store item data including a first item of high rarity that is difficult for a player to obtain and a second item of low rarity that is easy for a player to obtain according to a progress of the game in at least the first game apparatus, a method comprising:

detecting a link strength for wireless communication between the first game apparatus and said at least one second game apparatus;

determining whether the detected link strength is greater than or equal to a predetermined value which is based on the communication link between the first game apparatus and said at least one second game apparatus;

permitting use of said first item in the first game apparatus with respect to a first item of high rarity that is difficult for a player to obtain in said at least one second game apparatus based on the progress of the game in said first game apparatus and in said at least one second game apparatus, while communication is maintained between the first game apparatus and said at least one second game apparatus, when said link strength is determined to be greater than or equal to the predetermined value; and denying use of said first item in the first game apparatus with respect to said first item in said at least one second game apparatus, while communication is maintained between the first game apparatus and said at least one second game apparatus, when said link strength is less than the predetermined value, and further comprising:

permitting use of said second item alone in the first game apparatus when said link strength is less than the predetermined value, and permitting use of said first item in the first game apparatus with respect to said first item in said at least one second game apparatus and use of said second item in the first game apparatus when said link strength is greater than or equal to the predetermined value.

12. The method according to claim 11, further comprising:

receiving partner's possessed item data related to an item possessed by said at least one second game apparatus;

determining whether said at least one second game apparatus possesses the first item based on said partner's possessed item data; and displaying a message indicating that said at least one second game apparatus possesses the first item when it is determined that said at least one second game apparatus possesses the first item.

13. The method according to claim 11, further comprising:

receiving partner's possessed item data related to an item possessed by said at least one second game apparatus; and displaying an image of the first item possessed by said at least one second game apparatus based on said partner's possessed item data when said link strength is greater than or equal to the predetermined value, and not displaying the image of the first item possessed by said at least one second game apparatus when said link strength is less than the predetermined value.

14. The method according to claim 11, further comprising:

receiving partner's possessed item data related to an item possessed by said at least one second game apparatus; and displaying the images of both of the first item and the second item possessed by said at least one second game apparatus based on said partner's possessed item data when said link strength is greater than or equal to the predetermined value, and displaying the image of the second item alone possessed by said at least one second game apparatus based on said partner's possessed item data when said link strength less than the predetermined value.

15. The method according to claim 11, wherein use of said first item occurs when said first item is matched with a first item possessed by said at least the second game apparatus.

* * * * *